(12) United States Patent
Wynn

(10) Patent No.: US 7,108,116 B2
(45) Date of Patent: Sep. 19, 2006

(54) CLUTCH ACTUATOR

(75) Inventor: Samuel R. Wynn, Marietta, OH (US)

(73) Assignee: Electronic Design for Industry, Inc., Marietta, OH (US)

( * ) Notice: Subject to any disclaimer, the term of this patent is extended or adjusted under 35 U.S.C. 154(b) by 155 days.

(21) Appl. No.: 10/839,379

(22) Filed: May 5, 2004

(65) Prior Publication Data

US 2005/0247535 A1    Nov. 10, 2005

(51) Int. Cl.
*F16D 19/00* (2006.01)
(52) U.S. Cl. .............................. 192/99 S; 74/2; 192/83
(58) Field of Classification Search ................ 192/83; 74/2
See application file for complete search history.

(56) References Cited

U.S. PATENT DOCUMENTS

| | | | | |
|---|---|---|---|---|
| 1,540,247 A | * | 6/1925 | Bowman ..................... 74/97.1 |
| 2,127,713 A | * | 8/1938 | Batten et al. ............ 192/48.91 |
| 3,481,437 A | * | 12/1969 | Araikawa ................ 192/89.29 |
| 3,752,283 A | * | 8/1973 | Fisher ....................... 192/99 S |
| 3,872,955 A | * | 3/1975 | McIntyre .................... 192/69.9 |
| 4,637,501 A | * | 1/1987 | Vaiden ......................... 192/20 |
| 5,109,968 A | * | 5/1992 | Pollitt et al. .................. 192/83 |
| 5,495,928 A | * | 3/1996 | Sando ..................... 192/89.29 |

* cited by examiner

*Primary Examiner*—Saul Rodriguez
(74) *Attorney, Agent, or Firm*—Jason H. Foster; Kremblas, Foster, Phillips & Pollick

(57) ABSTRACT

A clutch actuating apparatus for engaging a clutch on an engine, such as an engine that drives an oil or gas well pump. The clutch actuator includes a first prime mover for rotating a clutch operating shaft in one direction toward a clutch-engaging position, but which unseats from driving the shaft after the shaft reaches the break over point and before engaging the clutch to prevent clutch damage. A second prime mover rotates the clutch operating shaft in the opposite direction toward a clutch-disengaging position, and unseats from driving the shaft after the break over point.

10 Claims, 26 Drawing Sheets

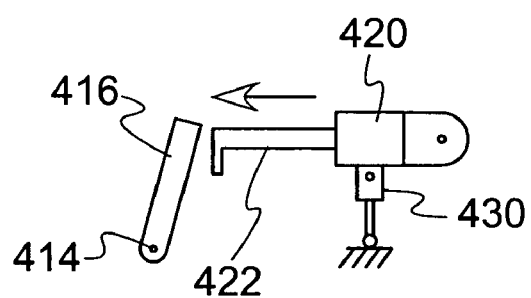
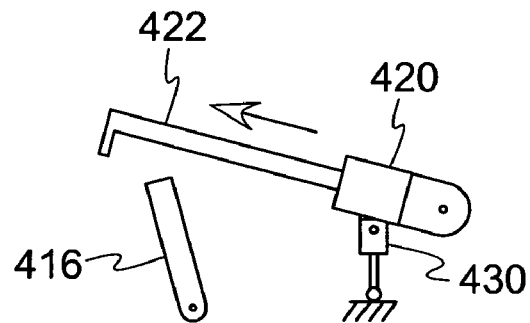
FIG. 12  FIG. 13
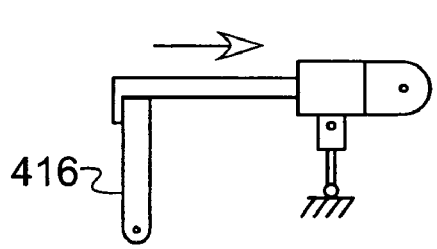
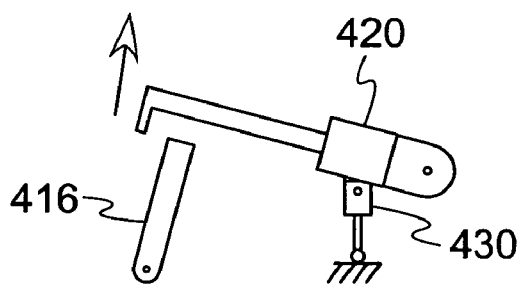
FIG. 14  FIG. 15

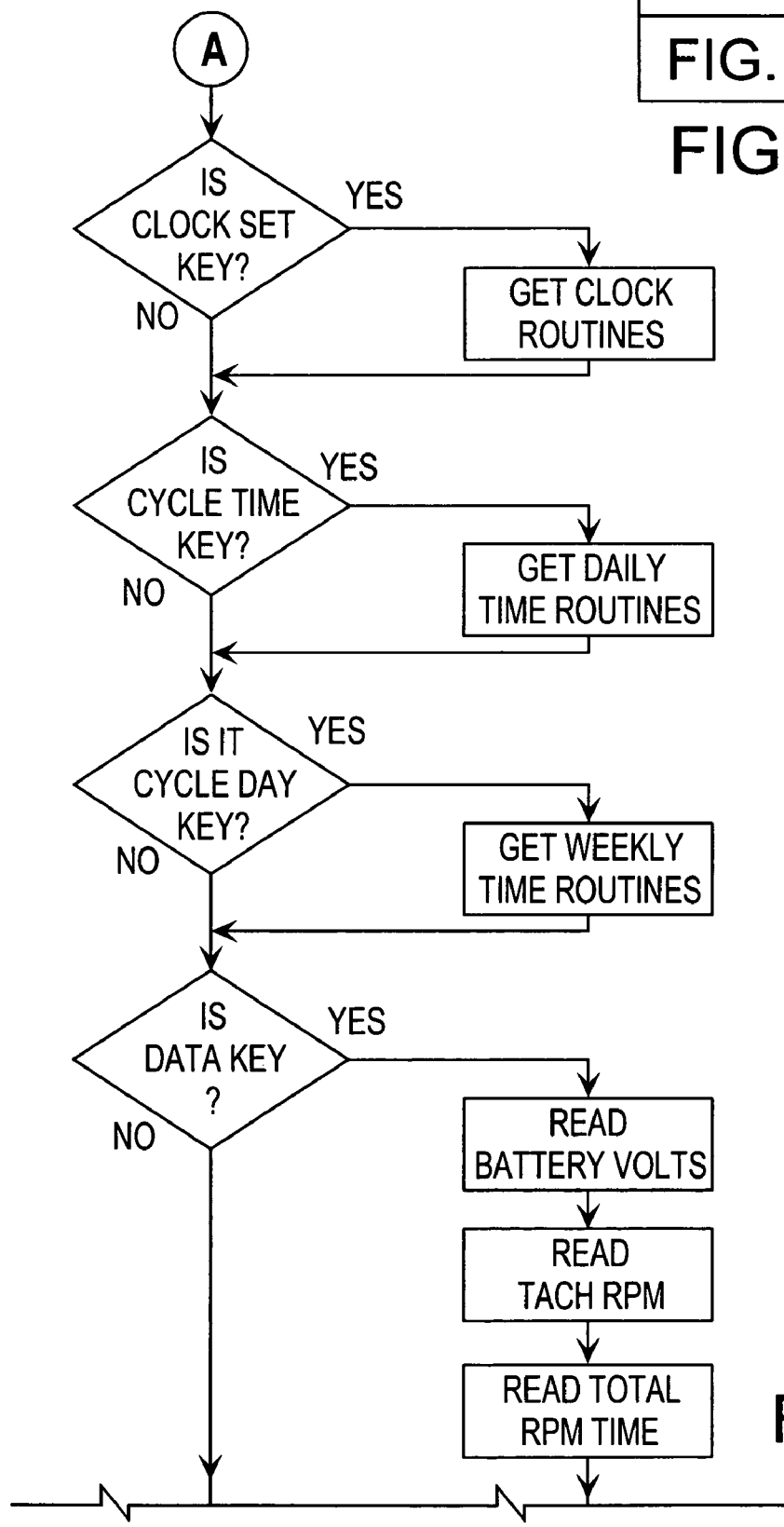

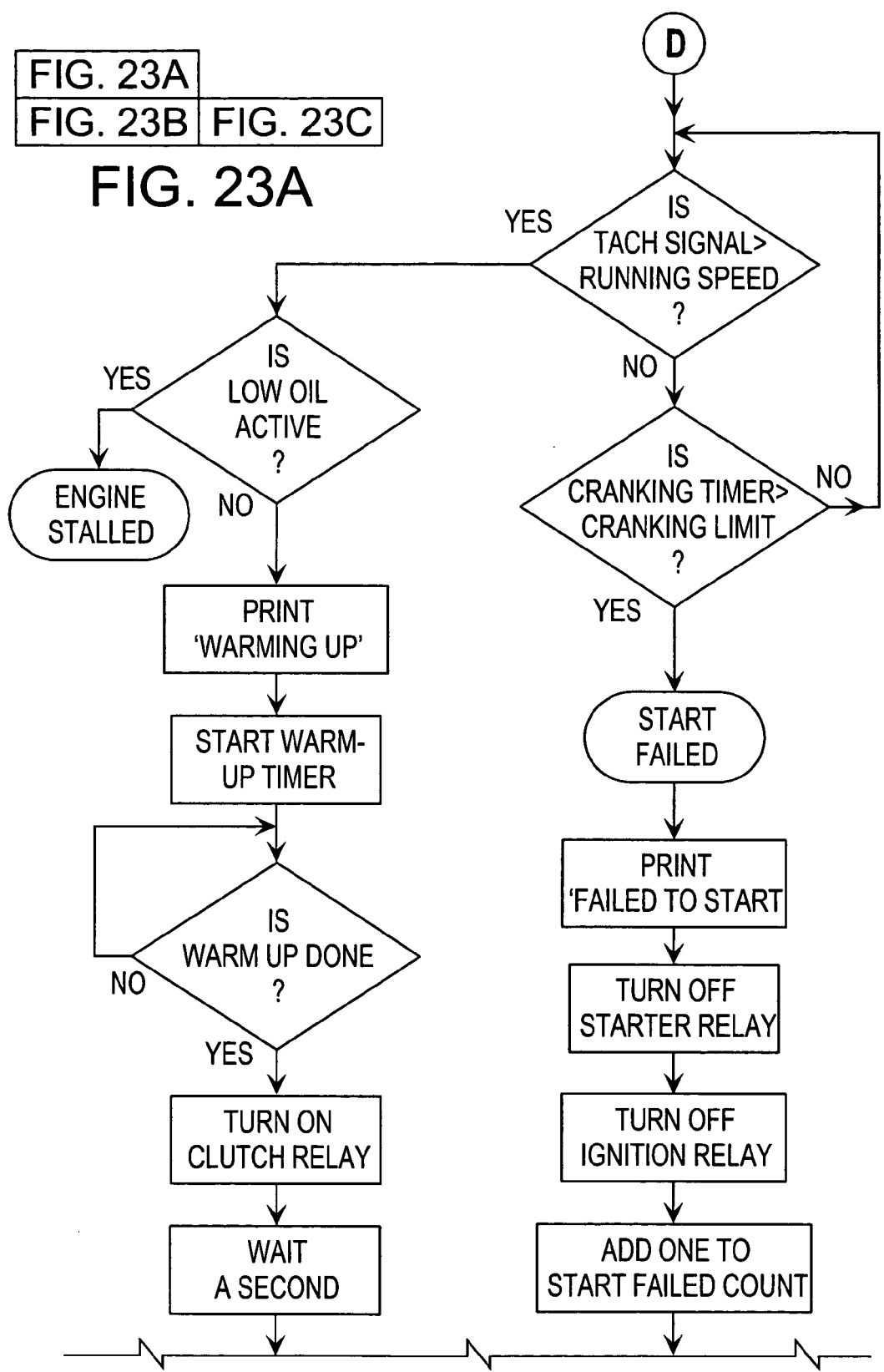

CLUTCH ACTUATOR

(e) BACKGROUND OF THE INVENTION

1. Field of the Invention

This invention relates generally to engines connected to driven devices, such as oil and gas well pumps, through a clutch mechanism. The invention relates more particularly to an apparatus for mechanically engaging and disengaging the clutch from the engine.

2. Description of the Related Art

It is well known in the field of oil and gas drilling and pumping to drill an oil or gas well and then place a pump at the well to pump oil or gas out of the well. The pumps of oil and gas wells are commonly driven by gasoline, or even more conveniently, natural gas engines. Natural gas is often plentiful at oil and gas wells, and can be used to fuel an internal combustion engine, for example, to drive the pump.

The conventional pump has an engine drivingly linked to the pump, and the engine is turned on by an operator who starts the engine and then drivingly links the engine to the pump. The engine pumps for as long as the engine's fuel lasts, or for some other set period, it turns off, and then the pump stops operating.

Because oil and gas wells are often in remote locations, it is common to start the engine to drive the pump, and then return long after the engine runs out of fuel or ceases operation for some other reason. This arrangement avoids a situation in which operators must remain present at all pumps to oversee their operation, but has the distinct disadvantage of pumping too little fluid from the well. This arises due to the fact that pumping fluids from a well for a few hours every day in a month is much more effective than pumping fluids for only 20 consecutive hours in a month.

More recently, controllers were invented to operate engines a few hours per day over the course of a month. These controllers work well when the engine and pump can be completely controlled electronically. However, many larger pumps and engines cannot be controlled only electronically, due, in particular, to heavy clutch mechanisms. The only existing solution to the problem is for the human operator to engage the clutch mechanism manually upon startup of the engine, and return later when the engine is about to shut off, and manually disengage the engine from the pump.

Recently, an automatic starting system for such fluid pumping engines has become known. For example, Arrow Engine Company has an Auto Start System that uses an electric motor with a worm gear that drives a drive shaft along a longitudinal path. That drive shaft has a collar that fits over the end of the lever arm for a conventional manual clutch actuator. The drive shaft drives the lever arm in one direction for engaging the clutch, and in the opposite direction for disengaging the clutch. This mechanism has a tendency to destroy the clutch, because it continues to apply the clutch-engaging force even after the clutch has begun to engage. This causes the clutch to wear out prematurely, and interferes with the manual actuation of the clutch.

Therefore, there is a need for an automatic (i.e., non-manual) clutch actuator apparatus that avoids the need for constant human oversight of oil wells, but does not cause premature wear on clutches.

(f) BRIEF SUMMARY OF THE INVENTION

Generally, the invention is a clutch actuating apparatus for engaging and disengaging a clutch, and thereby drivingly linking and unlinking an engine and a driven device. The apparatus includes an axle rotatable between a clutch-engaging position and a clutch-disengaging position with a break over point therebetween. The clutch actuating apparatus comprises a body drivingly linked to the axle. Means are provided for seating against and displacing the body in a first direction, thereby rotating the axle at least to near the break over point and for unseating from the body after the axle has reached the break over point and before the axle reaches the clutch-engaging position. Furthermore, means are provided for seating against and displacing the body in a second, opposite direction, thereby rotating the axle at least to near the break over point and for unseating from the body after the axle has reached the break over point.

In a preferred embodiment, an elongated bar is mounted transversely to the axle intermediate its opposing first and second bar ends. The first and second bar ends form a first leg and a second leg, respectively. Most preferably, an arm is interposed between the axle and the bar. The arm is radial to the axle and transverse to the bar. A first prime mover, preferably a pneumatic ram, has a displaceable pusher near the first leg, and a second prime mover, preferably a pneumatic ram, has a displaceable pusher near the second leg. Finally, means are provided for actuating the first prime mover to displace its pusher to seat against the first leg, and thereby rotate the axle in a first direction past the break over point toward the clutch-engaging position, and for subsequently actuating the second prime mover to displace its pusher against the second leg, and thereby rotate the axle in a second, opposite direction past the break over point toward the clutch-disengaging position. Said means preferably comprise a computer or logic circuit combined with an electro-pneumatic controller.

The present invention has the advantage that, once it is programmed, it automatically and mechanically actuates the clutch without an operator present. Furthermore, manual actuation of the clutch is still possible without it being necessary to disengage the invention. Still further, the invention actuates the clutch without causing any more wear on the clutch than would otherwise arise from ordinary manual actuation of the clutch. The invention may actually cause less wear than manual actuation, because of the fact that the invention prevents "riding" of the clutch.

(g) BRIEF DESCRIPTION OF THE SEVERAL VIEWS OF THE DRAWINGS

FIG. 12 is a schematic view illustrating an alternative prime mover apparatus.

FIG. 13 is a schematic view illustrating the alternative prime mover apparatus of FIG. 12 in another position.

FIG. 14 is a schematic view illustrating the alternative prime mover apparatus of FIG. 12 in another position.

FIG. 15 is a schematic view illustrating the alternative prime mover apparatus of FIG. 12 in another position.

Figure 1:
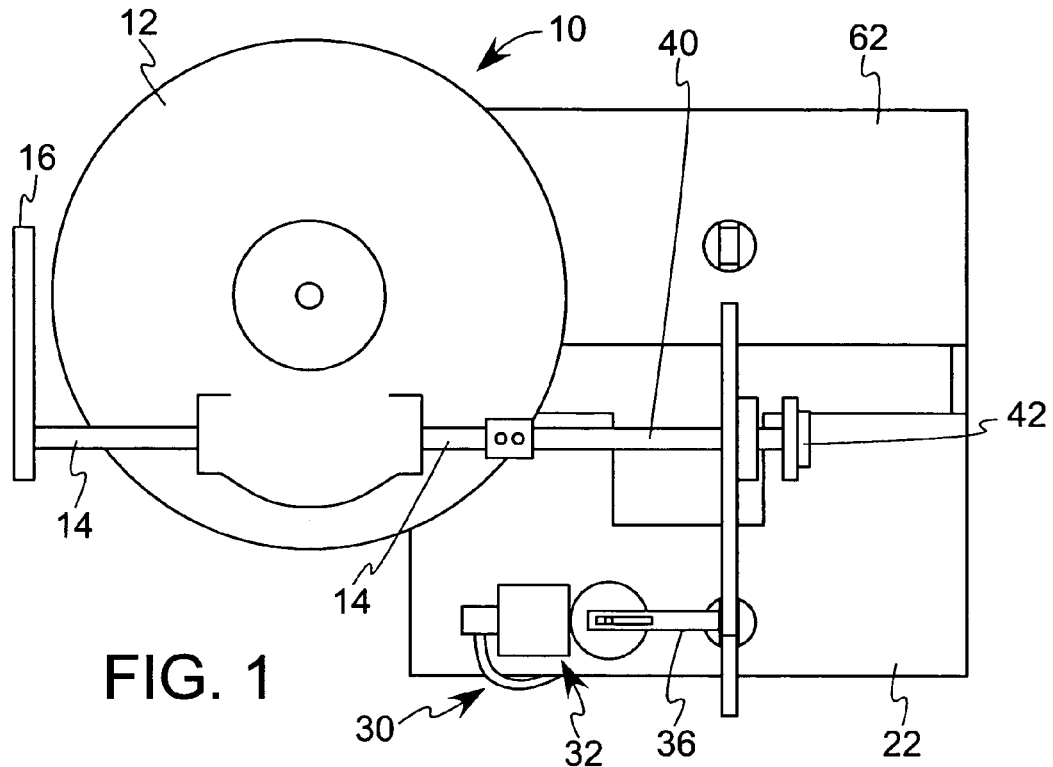
FIG. 1 is a side view illustrating the preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

(h) DETAILED DESCRIPTION OF THE INVENTION

The present invention is shown in FIG. 1 mounted to an engine 10, which is a conventional internal combustion engine. As is well known, but not visible in FIG. 1, the engine 10 has a crankshaft that is driven in rotary motion by the combustion of fuel, such as natural gas, gasoline, or any suitable fuel. The crankshaft is drivingly linked to a flywheel which is housed in close proximity to a clutch plate in the housing 12 shown in FIG. 1. The drive shaft can be drivingly linked to the clutch plate, because the clutch plate is moveable from an engaged position in which it makes contact with the flywheel to a disengaged position in which it is spaced from the flywheel. In the engaged position, the clutch rotates with the flywheel, and in the disengaged position, the clutch does not rotate with the flywheel.

A clutch operating shaft 14, which is an axle rotatably mounted in bearings through the housing 12, is drivingly linked to the clutch, and a lever 16 is radially mounted on the clutch operating shaft 14. Upon angular movement of the lever 16 from one extreme position (as shown in FIG. 1) to the opposite extreme position, the clutch is thereby moved within the housing 12 from the disengaged position (shown in FIG. 1) to the engaged position. In the engaged position, the drive shaft is driven, and in the disengaged position, the drive shaft is not driven.

Mechanical springs prevent the clutch operating shaft from stopping at a position intermediate the two extremes. The point exactly between the two extreme positions is commonly called the "break over point", because when a person applies an angular force to the lever 16 to rotate the clutch operating shaft 14, upon reaching the break over point, the mechanical springs bias the clutch operating shaft 14 to rotate to the opposite extreme position. An opposing bias is ordinarily applied when the lever 16 is moved in the opposite direction past the break over point. Therefore, one who forces the lever 16 from one extreme to the break over point need not apply a force significantly beyond the break over point. Upon reaching the break over point, the bias takes over and forces the clutch operating shaft 14 to the opposite extreme position.

The invention is mounted in close proximity to the housing 12 of the engine 10, preferably by removing some of the bolts that conventionally mount the housing 12 to the engine 10, and extending the bolts through portions of the invention having holes aligned with the housing holes. Of course, any suitable attachment is acceptable. A lower assembly 20 includes a stiff plate 22 that is mounted to the housing 12. An air chamber 24, which is a conventional pneumatic prime mover, is mounted to the rear of the plate 22 with its pusher arm 26 extending through the plate 22 to the front side. A valve assembly 30, show in FIG. 1 and described further below, is also mounted to the plate 22.

A clutch operating shaft extension 40 is mounted at one end to the clutch operating shaft 14 and at the opposite end extends into a bearing 42 mounted to the plate 22. The extension 40 is preferably machined to receive the spline clutch operating shaft 14, and mount thereto using screws or other attaching means, the configuration of which causes the clutch operating shaft extension 40 to rotate with the clutch operating shaft 14, and vice versa, without any relative rotational movement. The bearing 42 permits rotational movement of the extension 40 without substantial resistance.

An arm 50 (shown in FIG. 2) is rigidly mounted to the extension 40, and extends transversely from, and preferably radial and perpendicular to, the extension 40 as shown in FIG. 1. A bar 52 mounts at or near its intermediate point to the arm 50 to form the first leg 54 and the second leg 56. Thus, as the extension 40 rotates about its axis of rotation, the arm 50 and the legs 54 and 56 rotate about the same axis as the extension 40, which is the same axis as the shaft 14.

The upper assembly 60 is mounted near the housing 12, and is preferably similarly mounted to the housing 12 using housing bolts as with the lower assembly. The upper assembly 60 includes a stiff plate 62 that is mounted to the housing 12. An air chamber 64, which is a conventional pneumatic prime mover, is mounted to the rear of the plate 62 with its pusher arm 66 extending through the plate 62 to the front side. A bar 70 is mounted to both of the stiff plates 22 and 62, which are cantilevered from the housing 12, in order to rigidify the structure and form a mounting point for the pneumatic lines.

The air chambers 24 and 64 are mounted so that their pusher arms 26 and 66 extend from the plates 22 and 62, upon actuation, perpendicularly toward their respective corresponding legs. The pusher arms 26 and 66 have rollers 27 and 67, respectively, on their ends that function as wheels to contact the legs 54 and 56, thereby limiting wear on the contacting parts by reducing friction between the contacting parts. The rollers 27 and 67 preferably have sidewalls extending radially therefrom to maintain alignment between the rollers 27 and 67 and the legs 54 and 56 during contact. The legs 54 and 56 are preferably beveled to further encourage correct registration of each leg with each respective roller. When each leg is at an extreme position closest to its corresponding roller, it is spaced a fraction of an inch from that roller.

It will become apparent with this configuration that upon extension of the pusher arm 26 toward its corresponding leg 56, the roller 27 first seats against the leg 56, and then, upon the application of additional force to the pusher arm 26 by the air chamber 24, the roller 27 applies a force to the leg 56 along a line extending through the pusher arm 26, thereby rotating the clutch operating shaft 14. When the clutch operating shaft 14 is first rotated from its extreme position, it moves against the bias which tends to force the shaft 14 toward its original, extreme position. However, due to the bias of the mechanical springs, upon reaching and then slightly passing the break over point, the shaft 14 seeks the extreme position opposite to its original position. When the shaft 14 is forced by the bias toward the opposite extreme, the leg 56 unseats and separates from the roller 27 of the corresponding pusher arm 26.

After the leg 56 separates from the pusher arm roller 27, the pusher arm 26 can continue to be displaced by actuation of the air chamber 24. Instead, however, it is preferred that the air chamber 24 be controlled to stop the extending movement of the pusher arm 26 once the shaft 14 reaches the break over point or goes slightly past the break over point. The invention can be pre-programmed to stop the air chamber 24 from extending the pusher arm 26 after a predetermined distance is traversed, said predetermined distance being at least the distance between the pusher arm's rest position and the distance from the rest position that causes the clutch operating shaft 14 to reach the break over point. After traversing at least this distance, the air chamber 24 is preferably actuated to return the pusher arm 26 to its rest position. This control can take many forms, including a computer control, but the preferred manner of returning the pusher arm 26 to its original position is discussed below.

Figure 3:
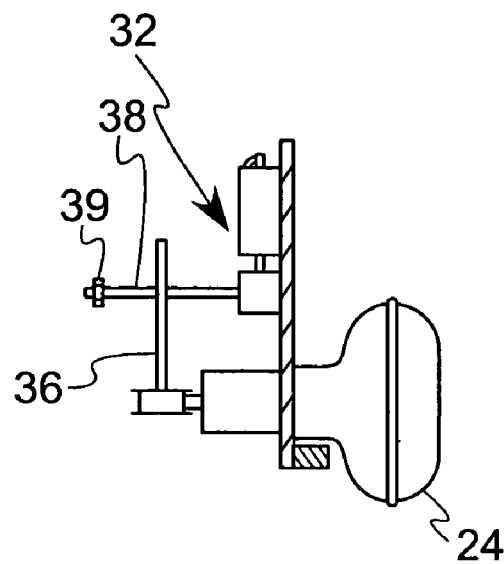
FIG. 3 is a top view in section through the line 3—3 of FIG. 4.

Once the clutch is engaged, as shown in FIG. 3, it will eventually be disengaged. Upon actuation, the upper air chamber 64 will extend its pusher arm 66 and the roller 67 will seat against the corresponding leg 54, and then begin to push the leg 54, and thereby, rotate the clutch operating shaft 14 in the direction opposite the direction it previously traveled. Upon thus rotating and reaching the break over point, the shaft 14 seeks the extreme position opposite to its previous position due to the bias of the mechanical springs, and this thereby separates the leg 54 from the roller 67 of the corresponding pusher arm 66. Again, the pusher arm 66 can continue to extend even after the shaft 14 has passed the break over point, but it is preferred that the pusher arm 66 be programmed to stop after traversing a predetermined distance. Thus, it will be apparent from the description herein that controlling the air chambers 24 and 64 to extend and withdraw at the appropriate time will result in mechanical actuation of the clutch.

As described above, the air chambers 24 and 64 are preferably conventional devices that operate on pressurized air or other gas. The pressurized gas is conveyed through tubes to and from the air chambers. In order to return the pusher arm 26 rapidly to its rest position (not extended), there is a fast release valve 32 that is part of the valve assembly 30 mounted to the lower assembly. The fast release valve 32 rapidly evacuates the pressurized gas from the lower air chamber 24, thereby returning the pusher arm 26 to its rest position under the influence of a mechanical spring inside the air chamber 24 that biases the pusher arm 26 to the rest position once the bias due to pressurized gas is removed. The prime movers 24 and 64, therefore, are preferably of the type that, upon release of the pressurized gas therefrom, withdraw their respective pusher arms back from the legs 54 and 56 against which they can seat. By incorporating the fast release valve 32 into the pneumatic circuit, the air chamber 24 can be rapidly evacuated upon triggering.

The advantage of rapidly returning the pusher arm 26 of the lower air chamber 24 to its rest position arises from the fact that the air chamber 24 is the prime mover that displaces the clutch operating shaft 14 to engage the clutch. It is when the clutch is being engaged that the clutch operating shaft 14 should not be pushed much beyond the break over point, or otherwise severe clutch wear occurs. By rapidly returning the pusher arm 26 to its rest position after the clutch operating shaft 14 rotates past the break over point, there is no danger of "riding" the clutch by extending the pusher arm 26 significantly past the break over point.

The fast release valve 32 is triggered by a finger 36 that extends laterally from the pusher arm 26. The finger 36 has a slot therein through which a rod 38 is extended from the fast release valve 32. The rod 38 is threaded, and has a nut 39 disposed along the rod's length at a point that is determined by the position of the pusher arm 26 at which the valve will be triggered. When the pusher arm 26 is extended by the air chamber 24, the finger 36 moves without restriction along the rod 38 until the finger 36 strikes the nut 39. Upon striking the nut 39, the pusher arm 26 continues to extend slightly, thereby displacing the rod 38 longitudinally. Once the rod 38 is displaced slightly longitudinally, the valve 32 is opened, the gas from the air chamber 24 is rapidly evacuated and the pusher arm 26 is retracted back to its rest position. The fast release valve 32 stays in the open position until after the upper air chamber 64 is actuated and returned to its original position, thereby providing the safety feature that the clutch must be automatically disengaged before it can be automatically engaged again.

Figure 4:
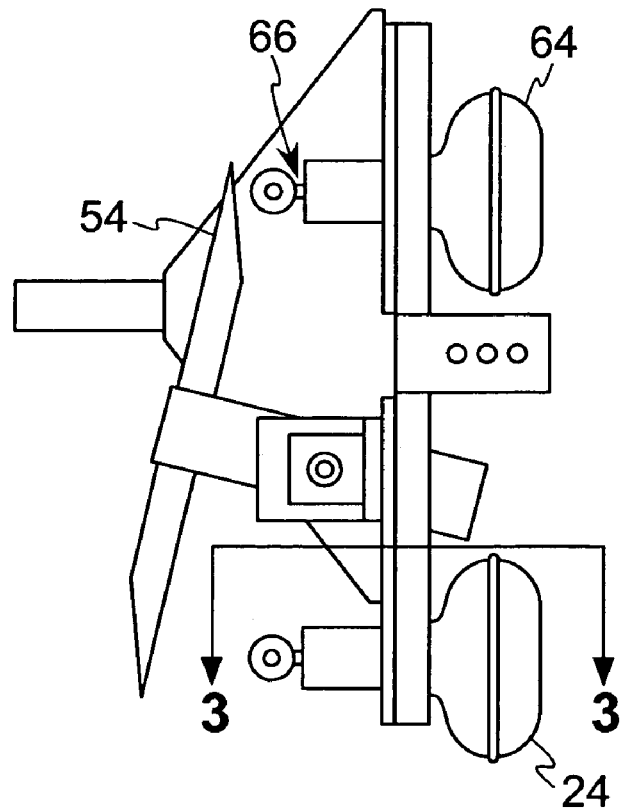
FIG. 4 is a side view illustrating the embodiment of FIG. 1.

Therefore, one can see that upon actuation from the position shown in FIG. 1, which is the clutch-disengaged position, the air chamber 24 displaces the clutch operating shaft 14 until at least the break over point, and preferably just past it. When the finger 36 mounted to the pusher arm 26 strikes the nut 39 of the rod 38 just after the clutch operating shaft 14 reaches the break over point, the fast release valve 32 rapidly evacuates the lower air chamber 24, thereby returning the pusher arm 26 to its rest position. By withdrawing the pusher arm 26 rapidly after the shaft 14 passes the break over point, the pusher arm 26 unseats from the leg 56, that is, the pusher arm 26 permits the leg 56 to pull away with no substantial restriction from the pusher arm 26 toward the clutch-engaging position. This "jump-ahead" by the biased clutch operating shaft and its connected links, in combination with the rapid withdrawal of the pusher arm 26, keeps the clutch from wearing more than normal. Thus, there is no possibility of causing excessive wear by "riding" the clutch with the present invention, after the clutch operating shaft 14 reaches the break over point, because the shaft 14 is biased toward the clutch-engaging position (shown in FIG. 4) and can reach it under the bias force without substantial resistance or hindrance of any kind from the rapidly removed force of the pusher arm 26.

At some point after the clutch is engaged, the means by which the entire invention is controlled, such as a computer as described below, actuates the upper air chamber 64 to extend the upper pusher arm 66. The extension of the pusher arm 66 first closes any gaps between the structures and then pushes the leg 54, and thereby the clutch operating shaft 14, toward the break over point. Once the break over point is reached, the air chamber 64 will eventually withdraw the pusher arm 66 as the clutch operating shaft 14, and the leg 54, are biased to the clutch-disengaging position (shown in FIG. 1). There can be a similar fast release valve for the air chamber 64, or there can simply be a predetermined maximum extension of the pusher arm 66. Because there is not the same problem at the extreme clutch-disengaging position as there is at the clutch-engaging position, there is not the same concern with such a fast release valve. Advantageously, the lever 16 can be actuated manually at any time with the present invention, because the withdrawn pusher arms 26 and 66 are not in the path that the legs 54 and 56 traverse between the two extremes of the clutch-engaged and the clutch-disengaged positions.

As will become apparent to one of ordinary skill in the art from the description herein, there are prime movers other than the preferred air chambers that can displace the clutch operating shaft 14 between the clutch-engaging position and the clutch-disengaging position. For example, a hydraulic prime mover, such as a hydraulic ram, or an electric motor can be used to displace the clutch operating shaft. Just about any prime mover will suffice, as will become apparent to a person of ordinary skill. Of course, such prime movers must be able to be unseated from driving the clutch operating shaft, such as by being stopped and/or reversed rapidly, to prevent damage to the clutch once the clutch operating shaft has reached the break over point.

Likewise, there are various different linkages that can convert the linear motion of the prime movers to rotary motion of the clutch operating shaft, and can permit the prime movers to seat and unseat from the clutch operating shaft to permit the clutch operating shaft to be biased without restriction to its extreme position. These linkages are too numerous to describe, and will become apparent to a person of ordinary skill from the description herein. Additionally, instead of a pneumatic valve, a proximity sensor, a pressure sensor or any other device can be used to detect when the prime mover moving the clutch operating shaft toward the clutch-engaging position should be withdrawn from the linkage mounted to the shaft, thereby permitting the shaft to be biased without restriction to its extreme position.

Figure 5:
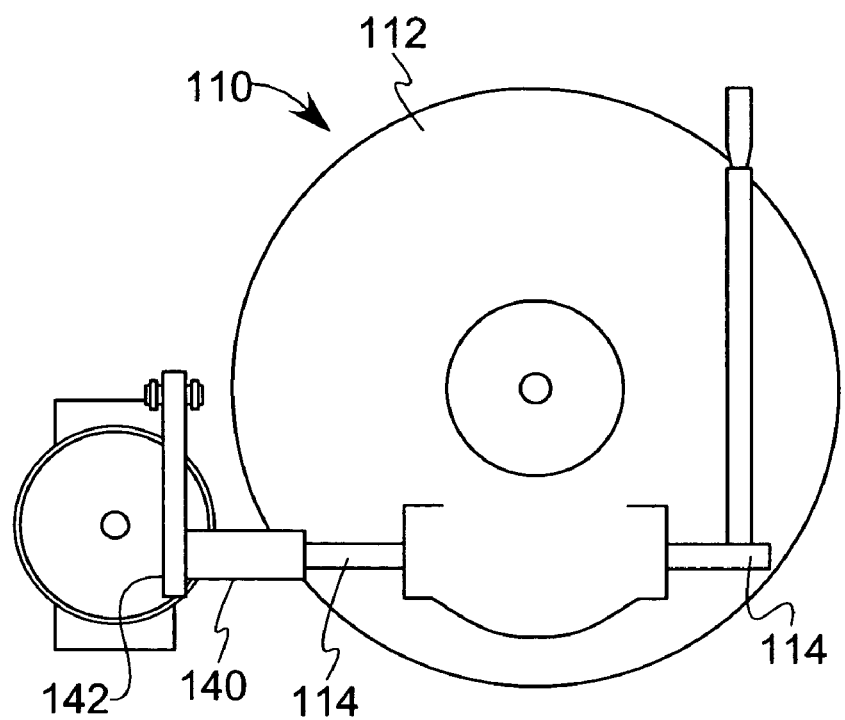
FIG. 5 is a front view illustrating an alternative embodiment of the present invention.
Figure 6:
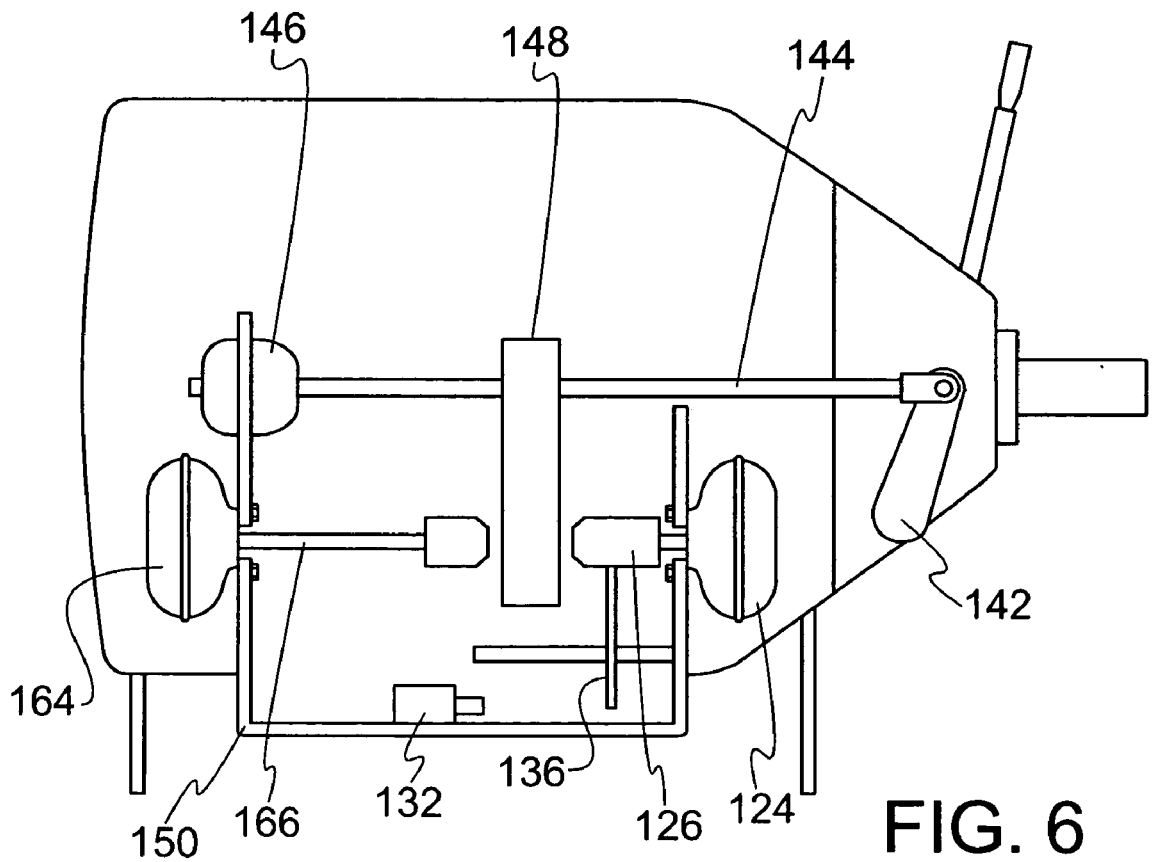
FIG. 6 is a side view illustrating the embodiment of FIG. 5.
Figure 7:
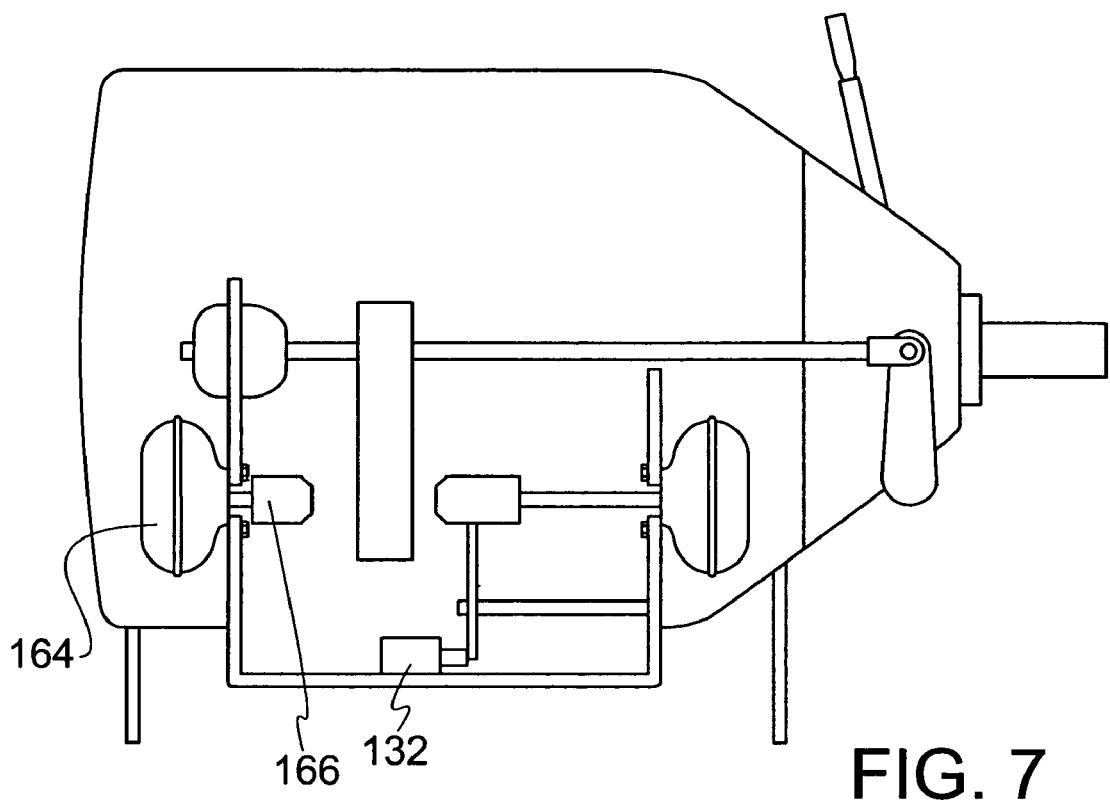
FIG. 7 is a side view illustrating the embodiment of FIG. 5.

Another example of an embodiment of the invention is shown from various perspectives in FIGS. 5, 6 and 7. The FIG. 5 embodiment is attached to an internal combustion engine 110 that has a clutch housing 112 with a clutch mechanism very similar to the FIG. 1 embodiment. The FIG. 5 embodiment, however, has a sleeve 140 securely mounted to the clutch operating shaft 114, and an arm 142 extending radially therefrom. The arm 142 is pivotably mounted to a drive shaft 144 that extends to a rear bearing 146 that permits longitudinal displacement of the drive shaft 144, and slight radial displacement of the drive shaft 144. The drive shaft 144 has a downwardly extending leg 148 that is rigidly mounted transversely, and preferably perpendicularly, to the drive shaft 144.

A U-shaped frame 150 is rigidly mounted to the engine, such as by weldments or screws. A first prime mover, such as the air chamber 124, is mounted to the frame 150 with a pusher arm 126 extending toward one side of the leg 148, and a second prime mover, such as the air chamber 164, is mounted to the frame 150 with a pusher arm 166 extending toward the opposite side of the leg 148. A fast release valve 132 is mounted to the U-shaped frame 150, and is connected pneumatically to the air chamber 124. The air chamber 124 also has a finger 136 extending downwardly from the pusher arm 126 to strike the fast release valve 132 at a predetermined point in its path of extension.

Thus, upon actuation of the air chamber 124, the pusher arm 126 seats against and then applies a force to displace the leg 148, and thereby the drive shaft 144 and rotate the clutch operating shaft 114. When the clutch operating shaft 114 is rotated past the break over point, it is biased toward the opposite extreme position, causing it to unseat and separate the leg 148 from the pusher arm 126. Once the pusher arm 126 reaches the point at which the finger 136 strikes the fast release valve 132, the air chamber 124 rapidly retracts the pusher arm 126 due to the rapid release of pressurized gas from the air chamber 124 as in the FIG. 1 embodiment. This prevents premature wear to the clutch. Thus, the clutch-engaging position shown in FIG. 7 is achieved.

At some point after the clutch is engaged, the controller actuates the air chamber 164 to extend the second pusher arm 166. The pusher arm 166 pushes the leg 148, and thereby the drive shaft 144, which rotates the clutch operating shaft 114, toward the break over point. Once the break over point is reached, the air chamber 164 eventually withdraws the pusher arm 166 as the clutch operating shaft 114, and the connected leg 148, are biased to the clutch-disengaging position (shown in FIG. 6). There can be a similar fast release valve for the second prime mover, or there can simply be a predetermined maximum extension of the pusher arm 166.

Figure 8:
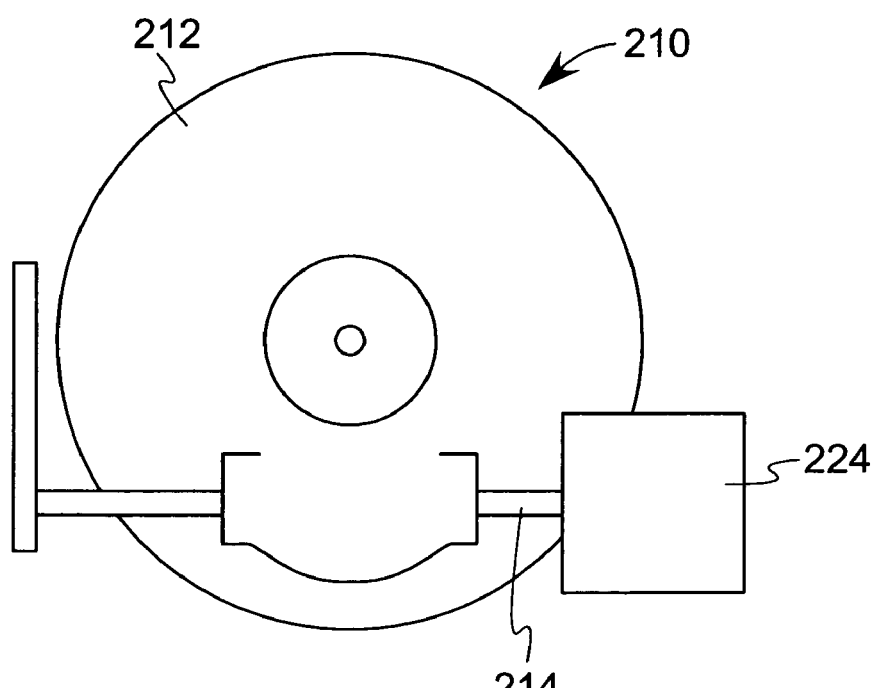
FIG. 8 is a front view illustrating an alternative embodiment of the present invention.
Figure 9:
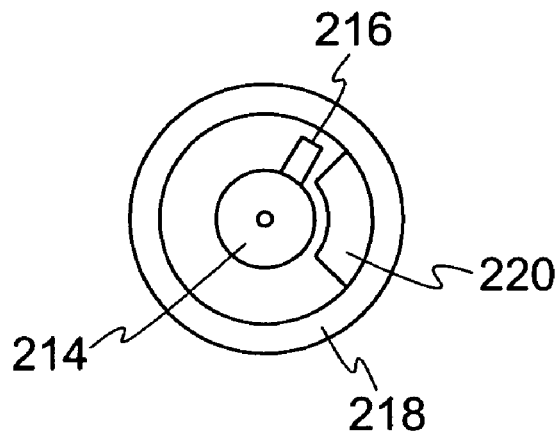
FIG. 9 is a schematic view illustrating a portion of the embodiment of FIG. 8.
Figure 10:
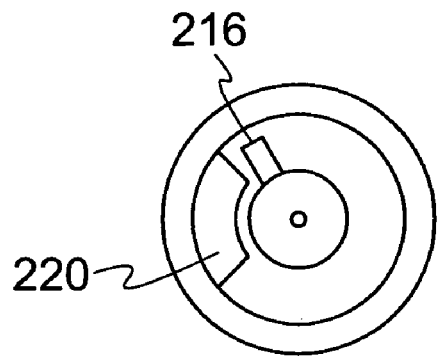
FIG. 10 is a schematic view illustrating a portion of the embodiment of FIG. 8.

Another example of an alternative embodiment of the invention is shown in FIGS. 8–10. The FIG. 8 embodiment includes an engine 210 having a housing 212 enclosing a clutch mechanism similar to that of the above-described embodiments. A rotary prime mover, such as the hydraulic motor 224, is positioned in close proximity to the clutch operating shaft 214. As shown in FIG. 9, the clutch operating shaft 214 has a leg 216 that extends radially outwardly toward the collar 218. The collar 218 is coaxial with the shaft 214 and is drivingly linked to the drive shaft of the prime mover 224. A pusher finger 220 extends radially inwardly from the collar toward the shaft 214.

The finger 220 and the leg 216 are aligned longitudinally to seat against one another upon sufficient rotation of the collar 218. Thus, if the collar 218 is rotated counterclockwise from the clutch-disengaged position shown in FIG. 9 toward the leg 216, the finger 220 will seat against, and then begin to displace, the leg 216, and the connected shaft 214, counterclockwise. Once the clutch operating shaft 214 reaches the break over point, it will begin to rotate on its own due to the bias away from the finger 220, and the clutch will be engaged. By ceasing the rotary motion of the prime mover 224 just after the shaft 214 reaches the break over point, and even rotating the collar 218 clockwise to the position shown in FIG. 10, the clutch will engage without the finger 220 applying further counterclockwise forces to the clutch operating shaft 214. Thus, the finger and leg unseat from one another.

After the clutch has been engaged, the collar can be rotated clockwise from the position shown in FIG. 10 to seat the pusher finger 220 against the opposite side of the leg 216. Upon further rotation, the leg 216, and thereby the shaft 214, are rotated to the break over point, thereby causing the clutch to disengage once the springs cause the shaft 214 to find the opposite extreme position.

Figure 2:
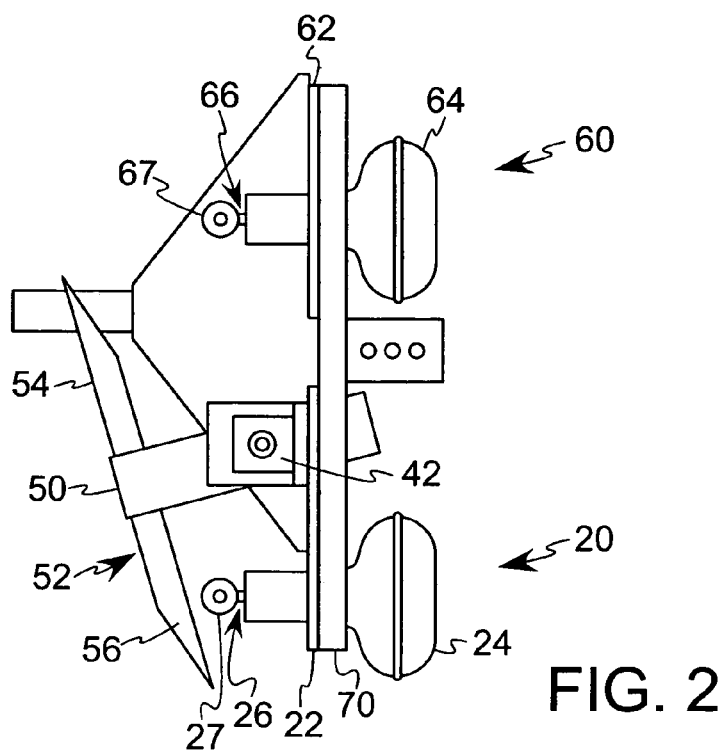
FIG. 2 is a side view illustrating the embodiment of FIG. 1.
Figure 11:
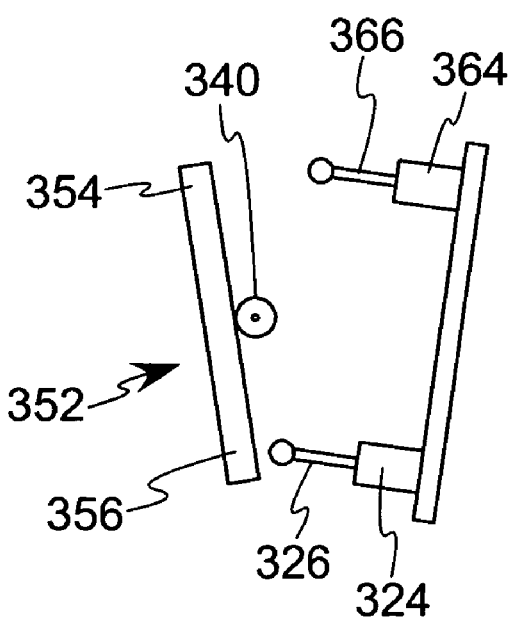
FIG. 11 is a schematic view illustrating an alternative mechanism connected to the clutch operating shaft.
Figure 16A:
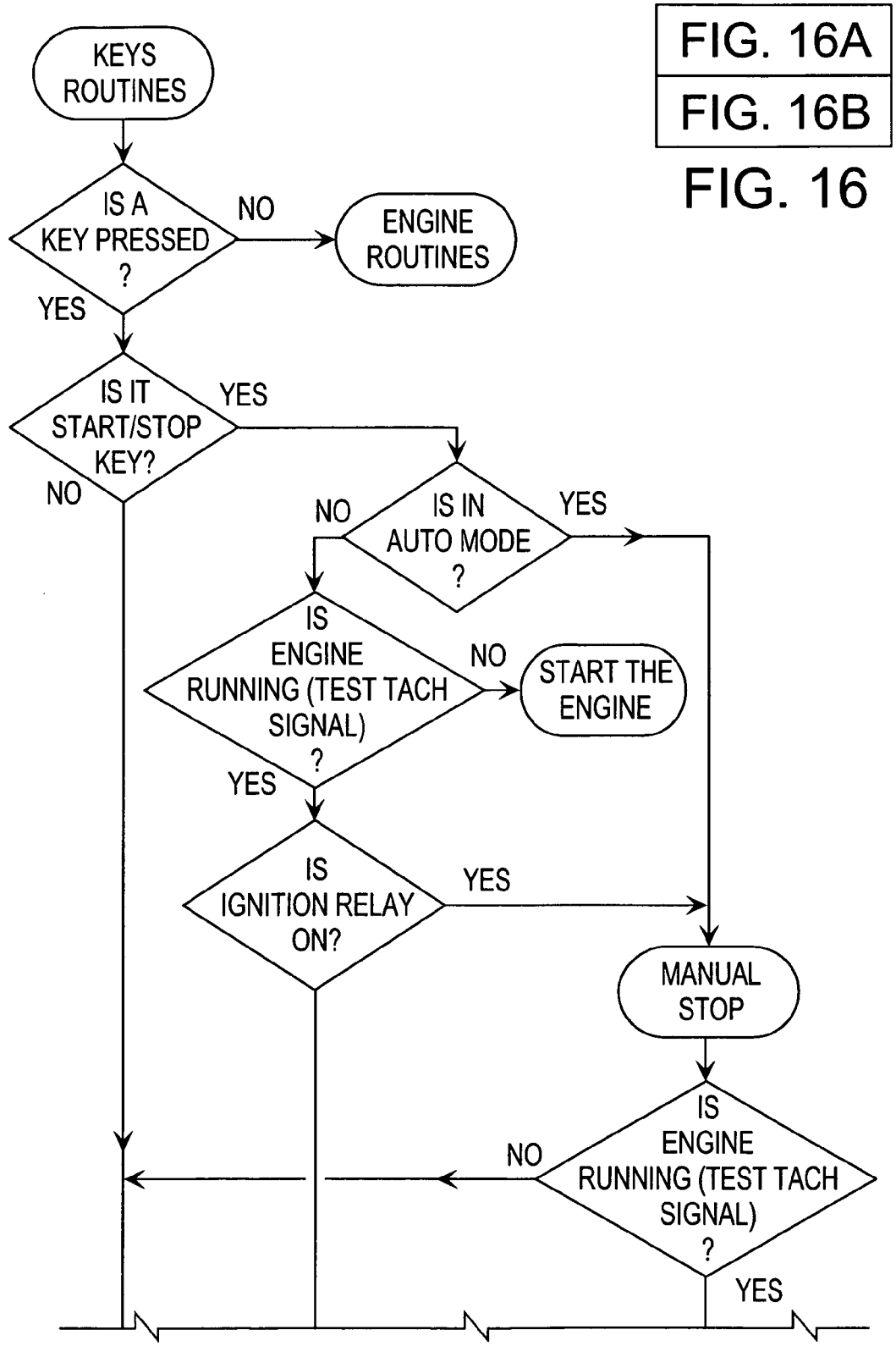
FIG. 16 is a flowchart illustrating steps of a method of controlling the present invention and its associated devices.
Figure 16B:
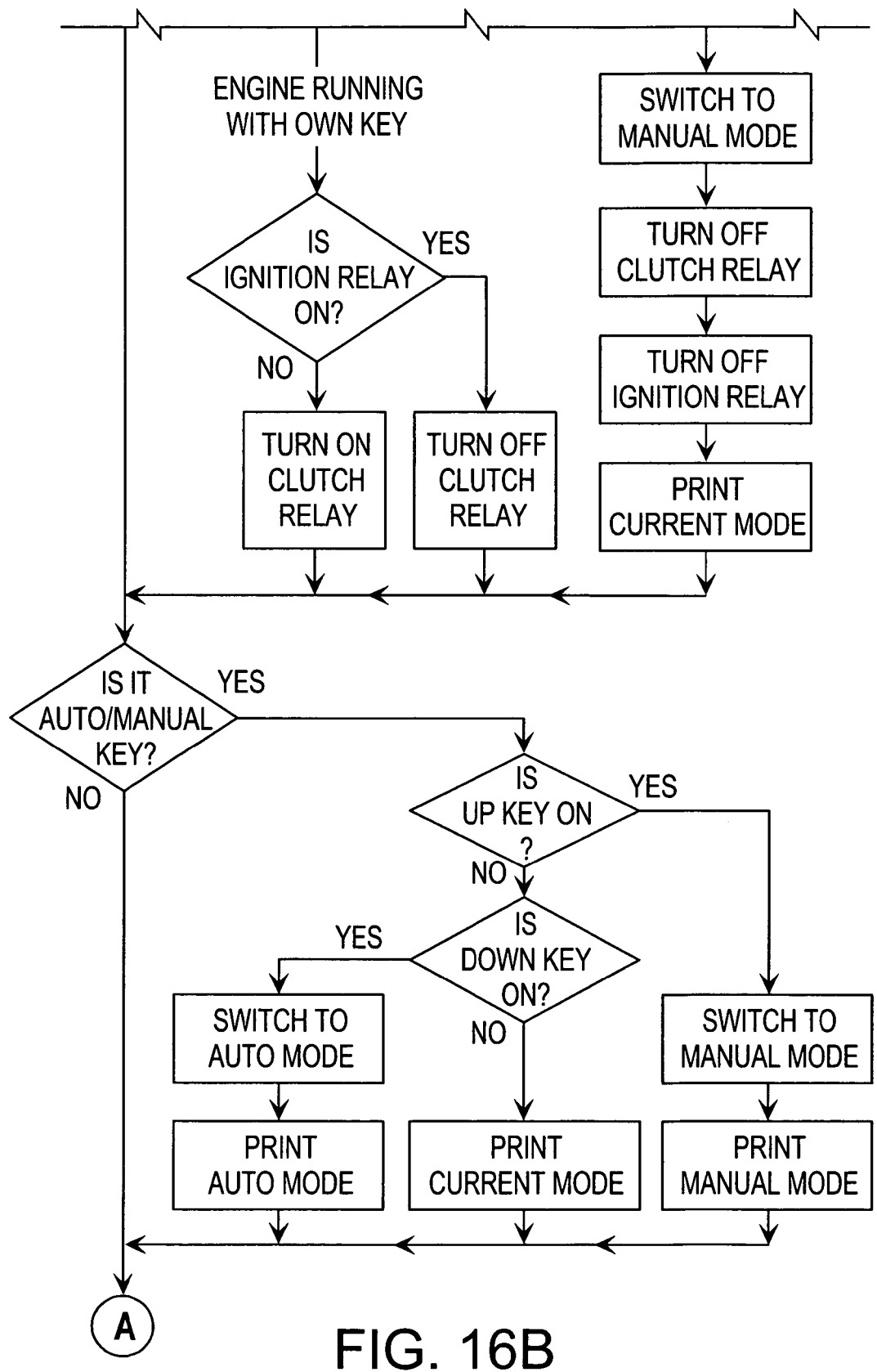
Figure 17B:
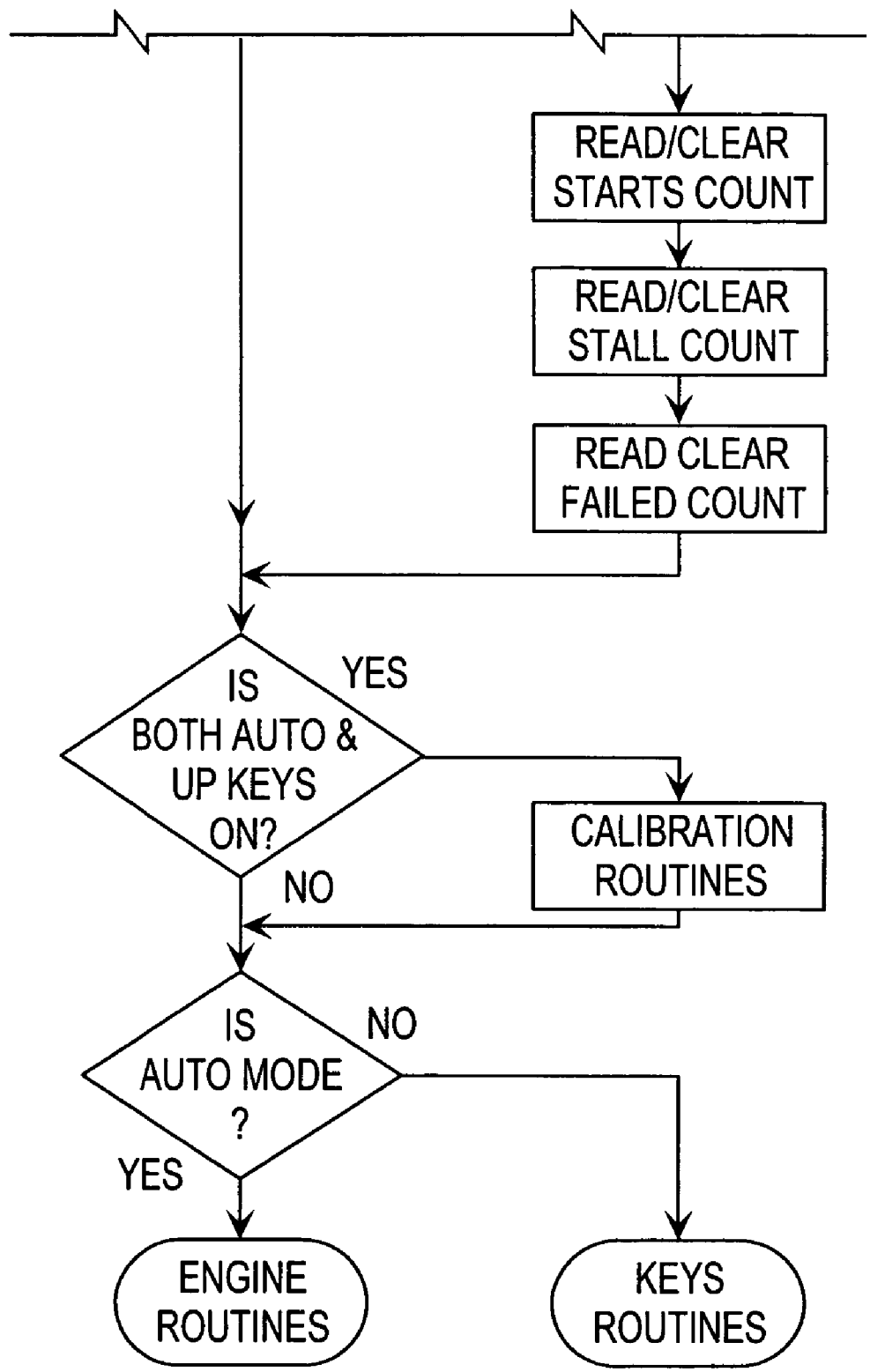
FIG. 17 is a continuation of the flowchart of FIG. 16.
Figures 18, 18A:
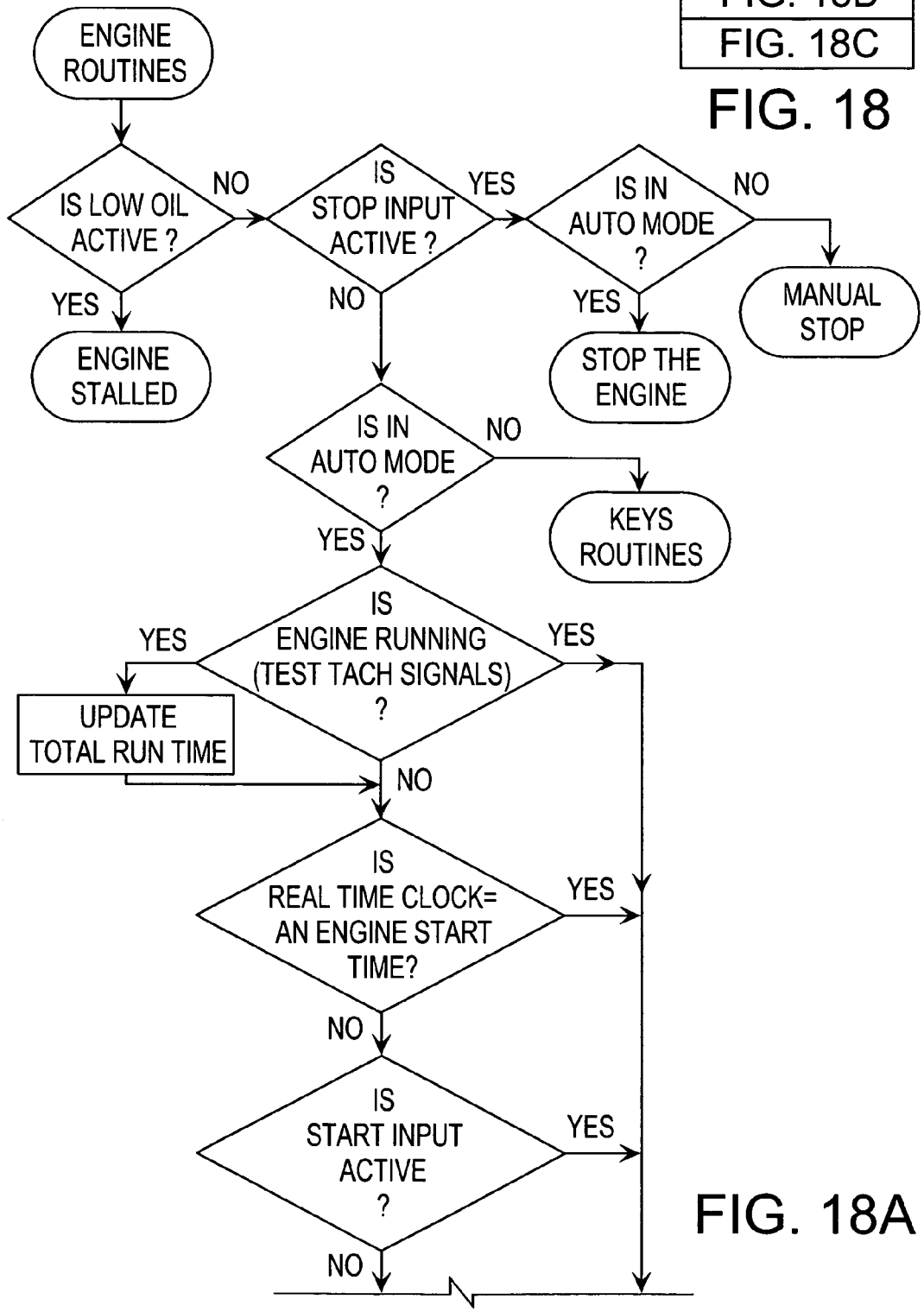
FIG. 18 is a flowchart illustrating steps of a method of controlling the present invention and its associated devices.
Figure 18B:
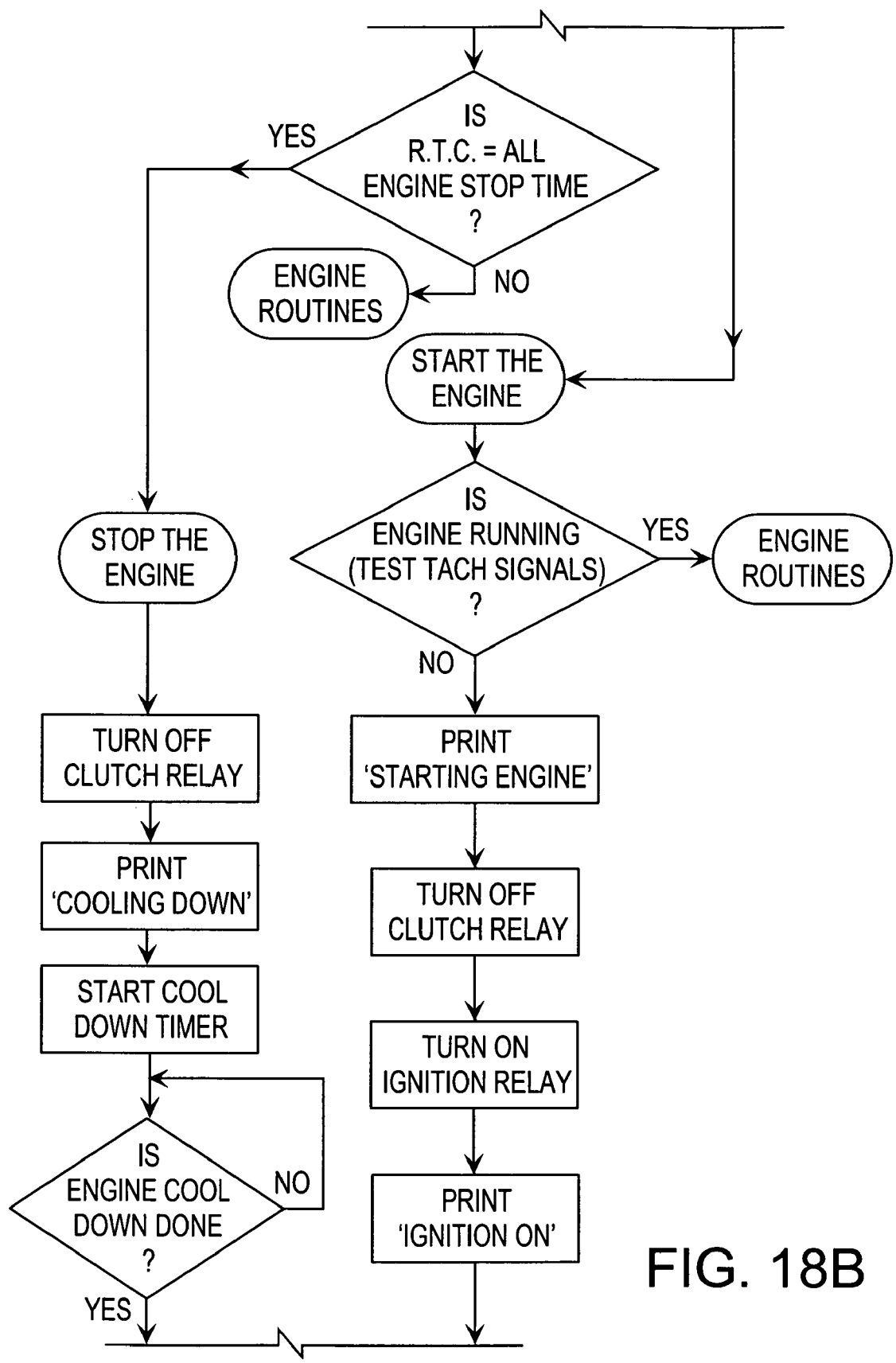
Figure 18C:
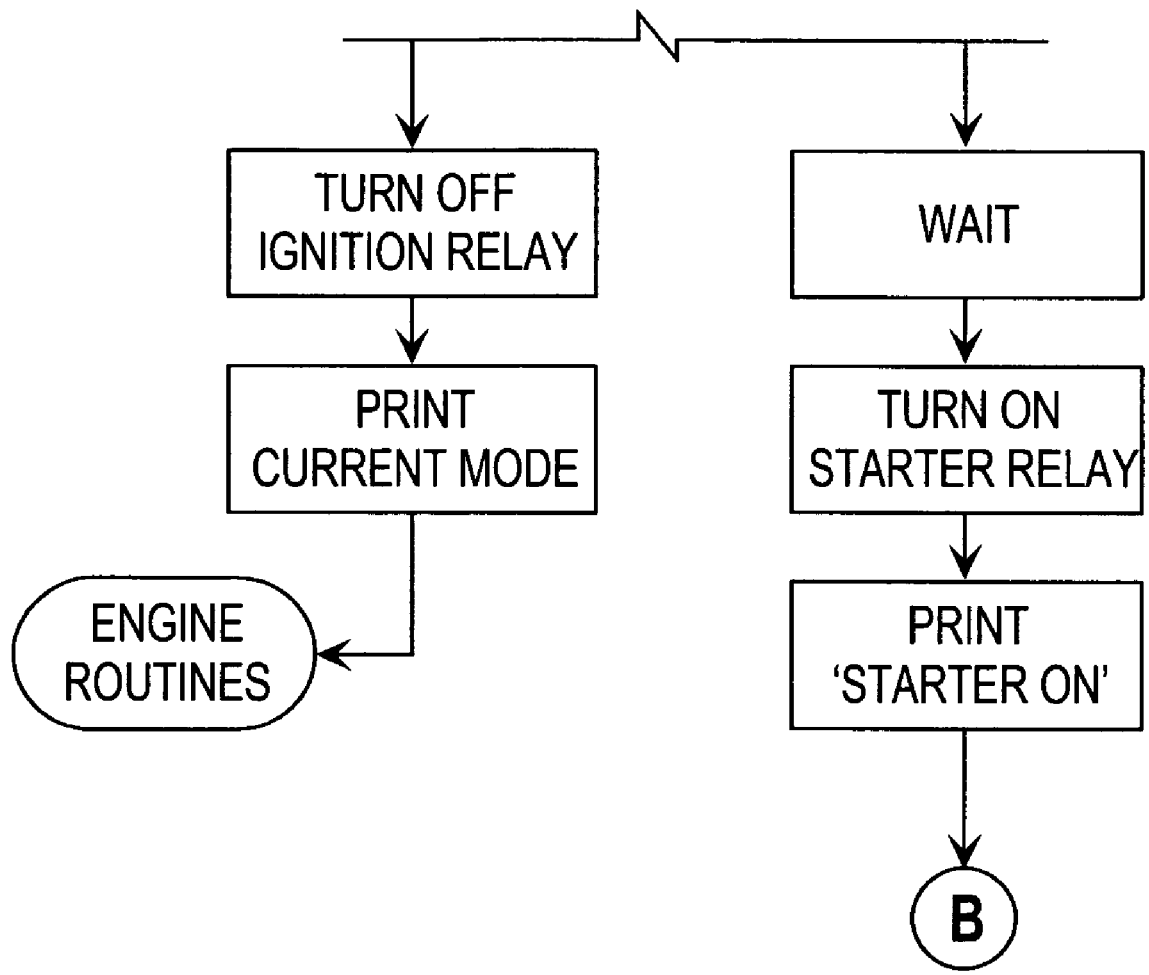
Figure 19A:
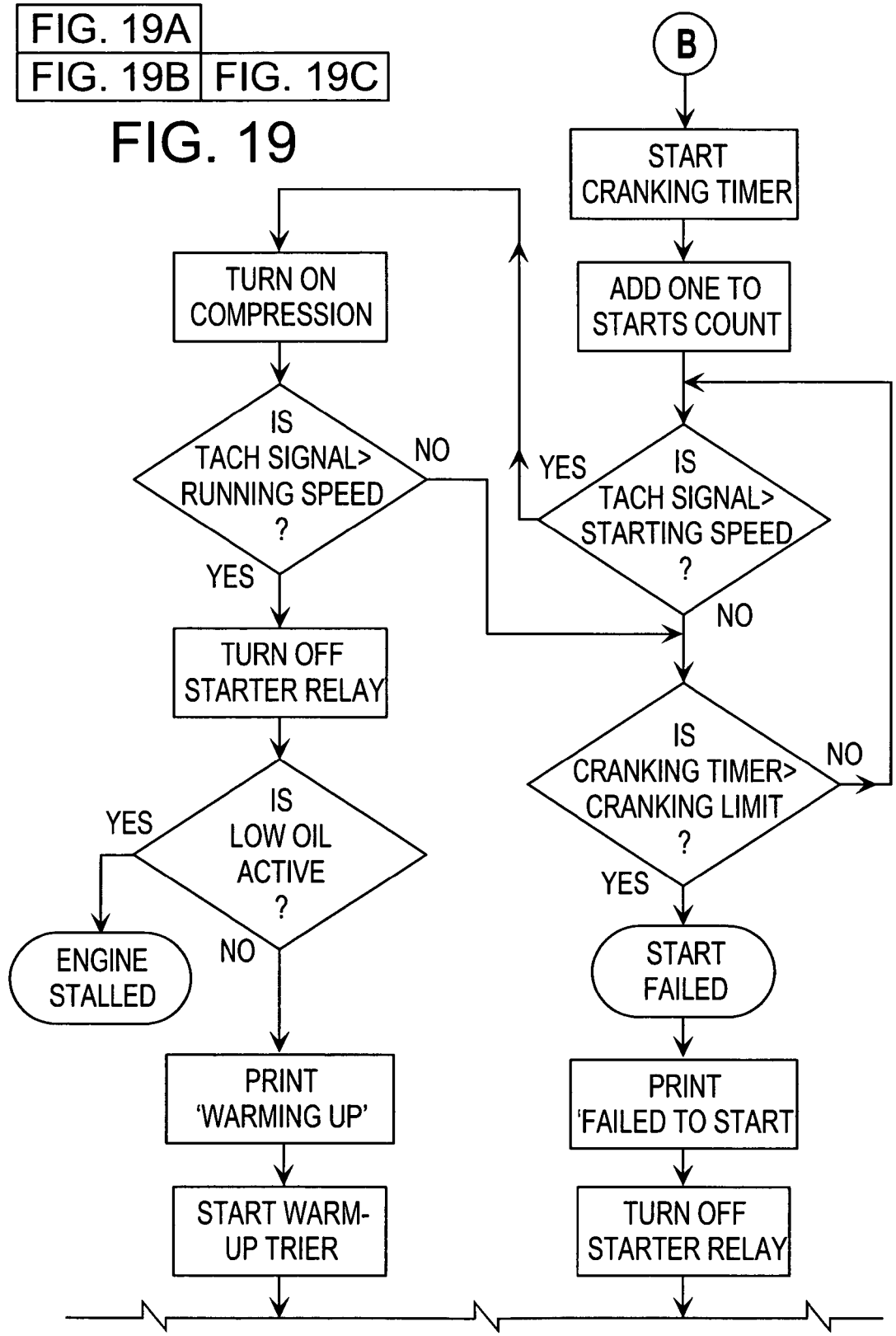
FIG. 19 is a continuation of the flowchart of FIG. 18.
Figure 19B:
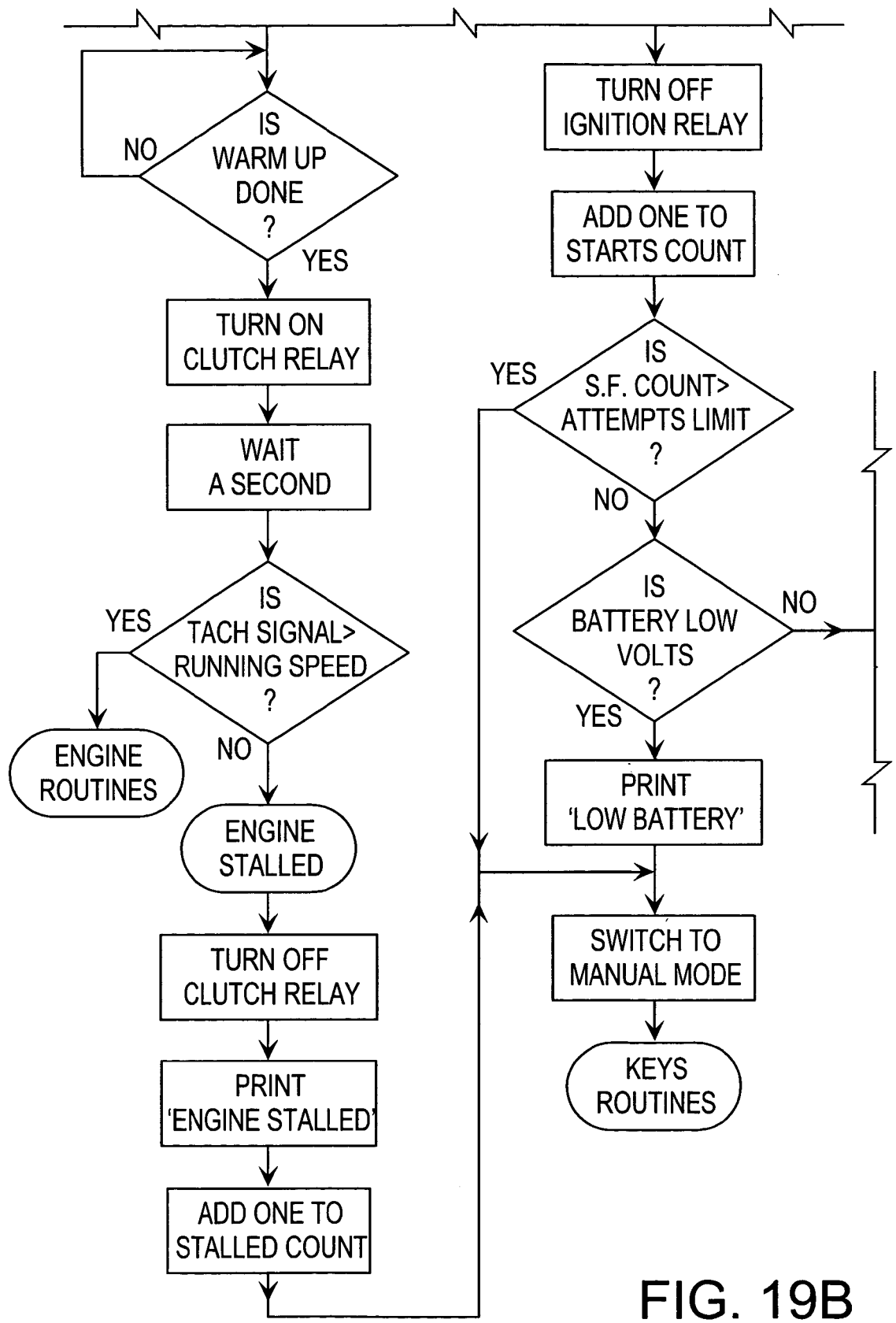
Figure 19C:
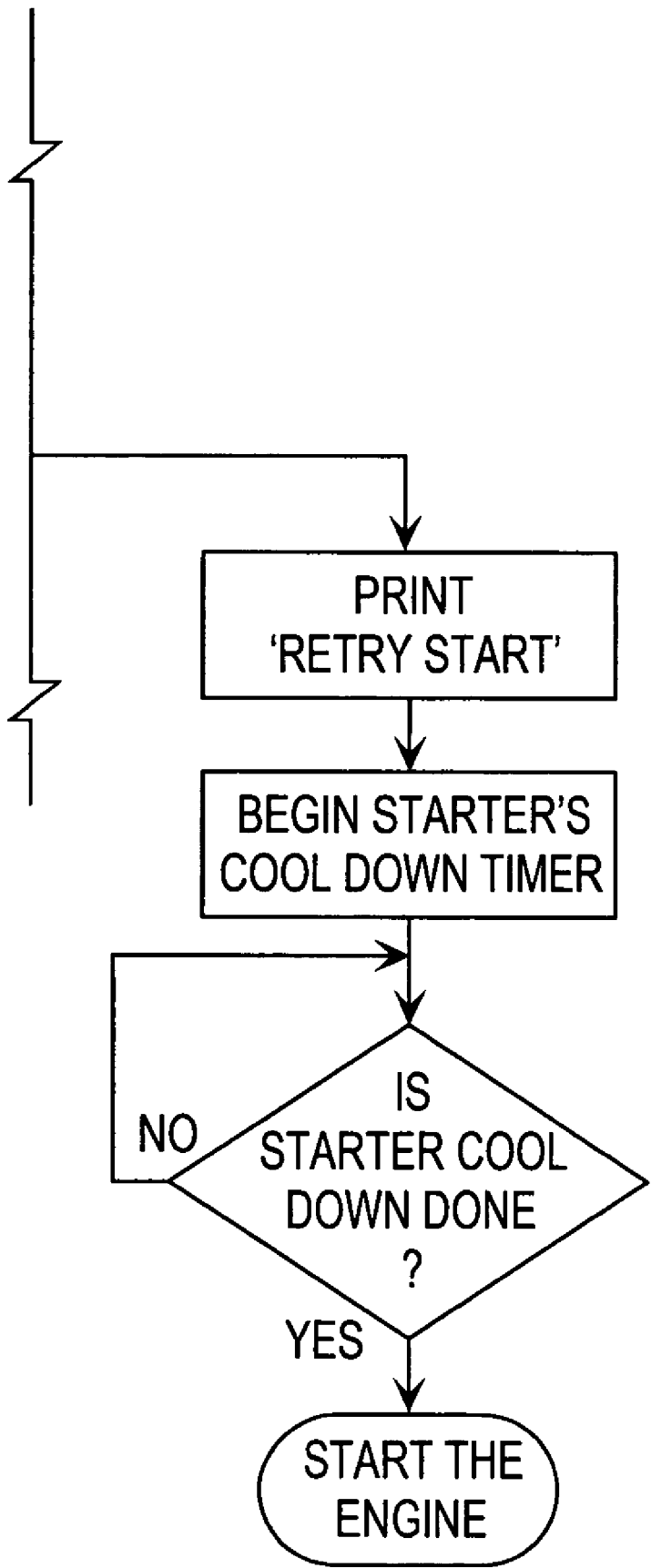
Figure 20A:
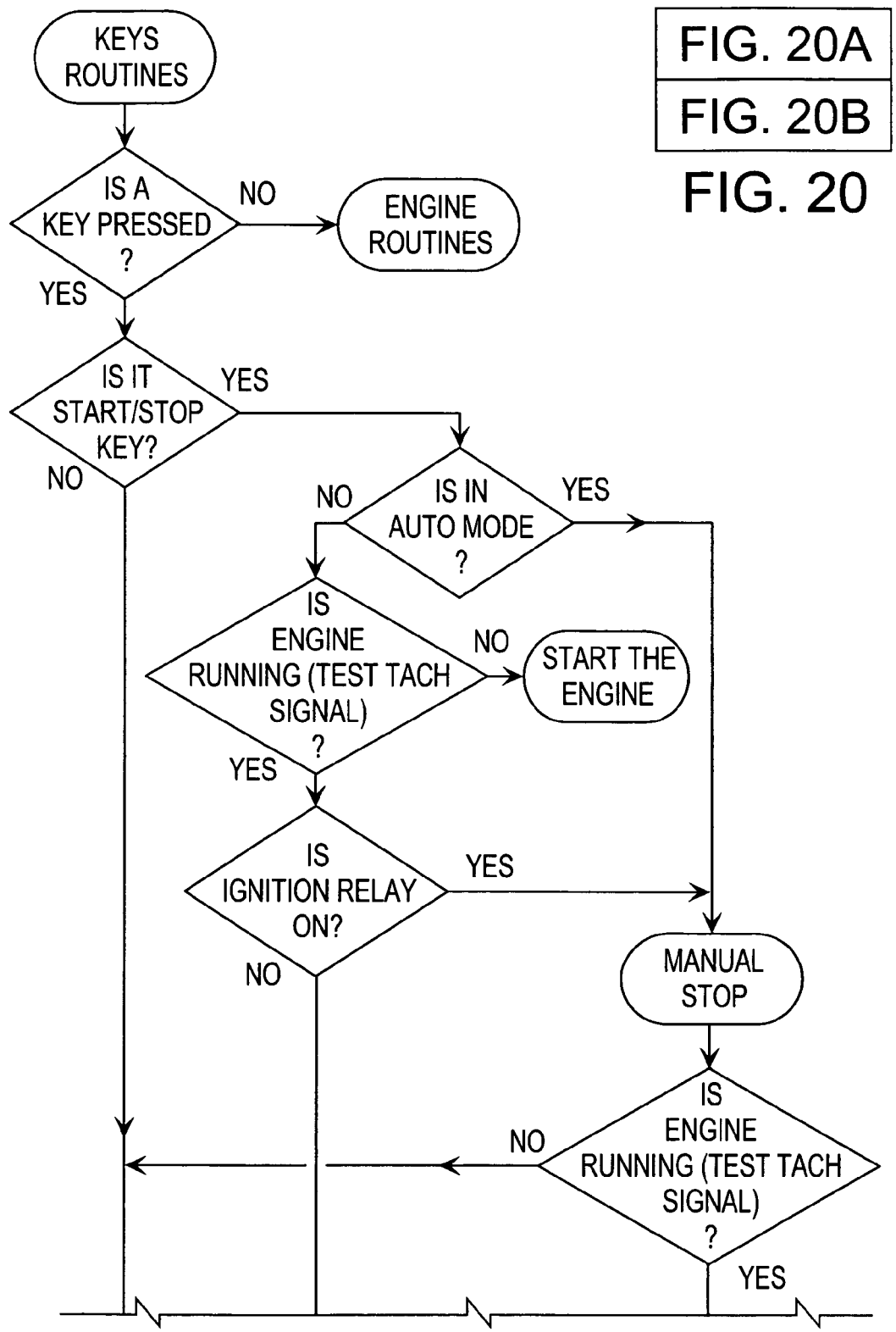
FIG. 20 is a flowchart illustrating steps of a method of controlling the present invention and its associated devices.
Figure 20B:
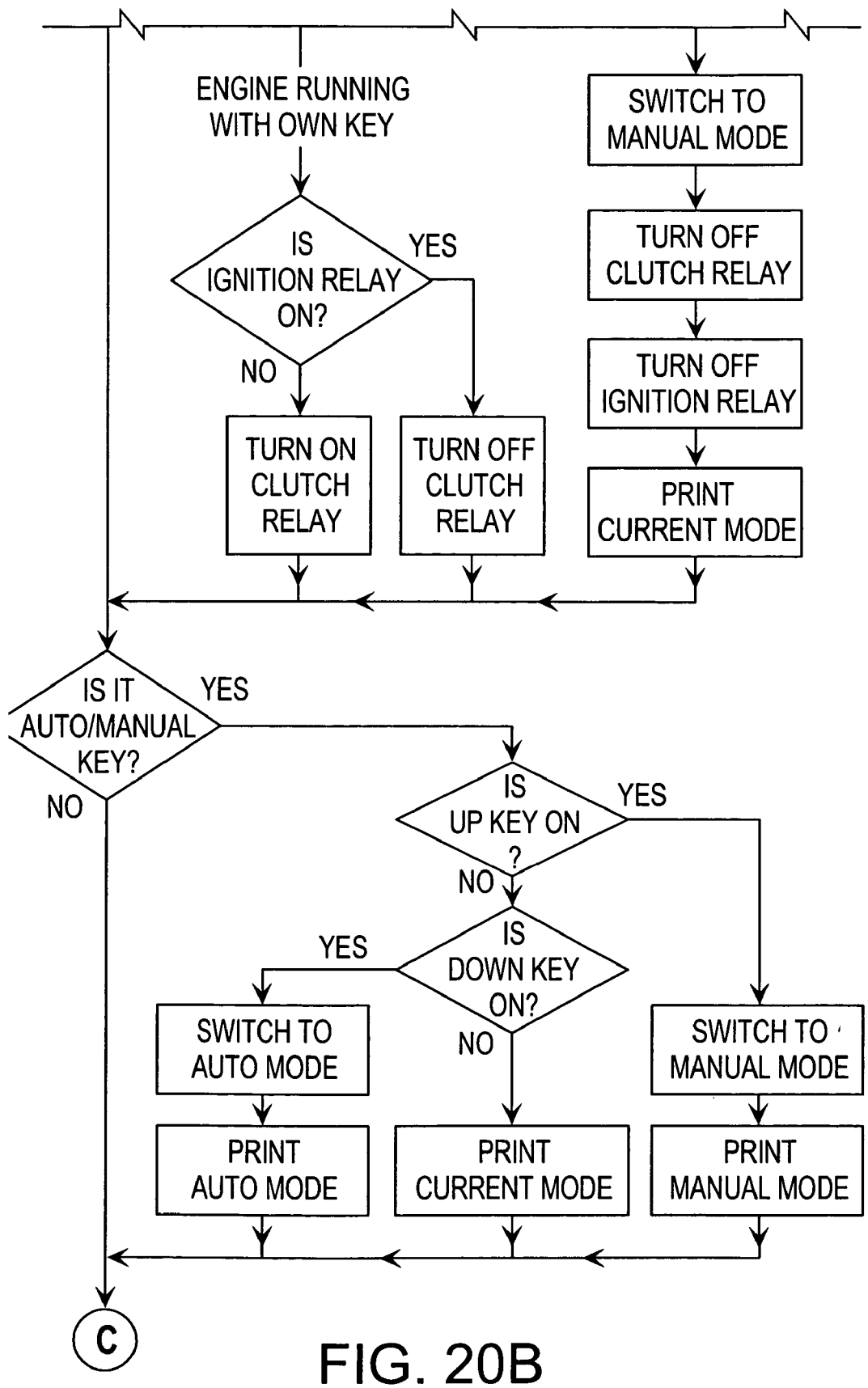
Figure 21A:
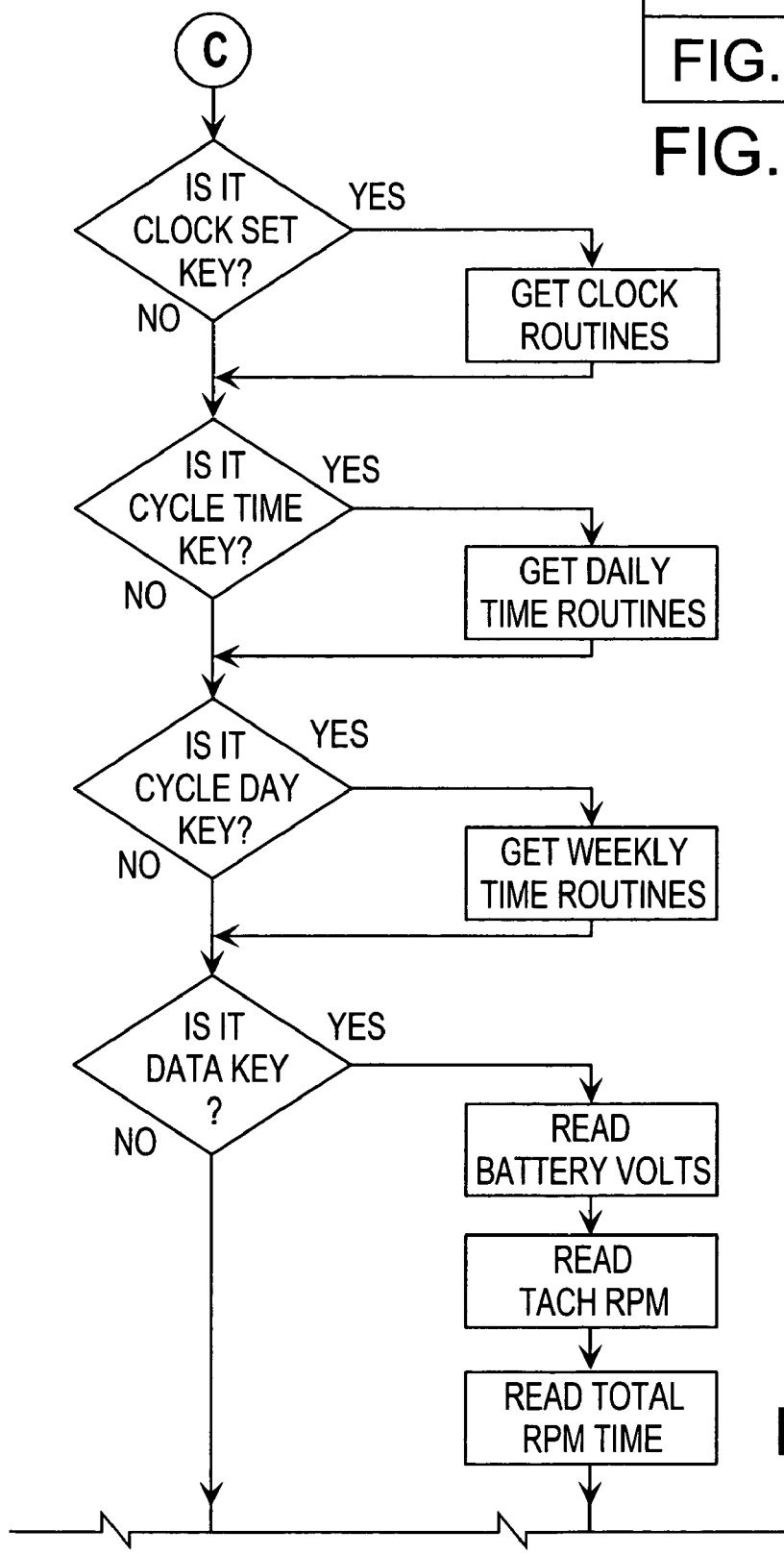
FIG. 21 is a continuation of the flowchart of FIG. 20.
Figure 21B:
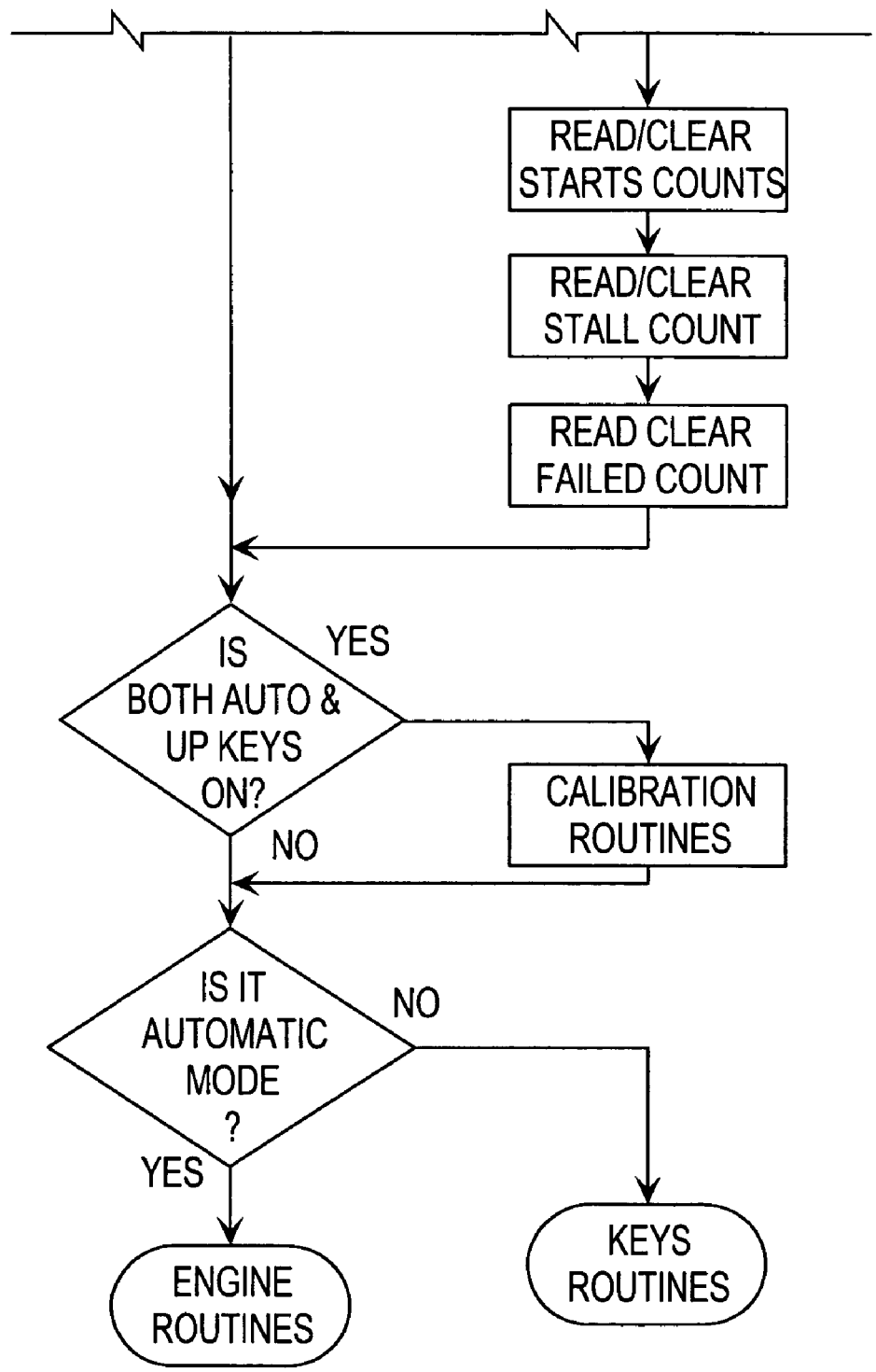
Figure 22A:
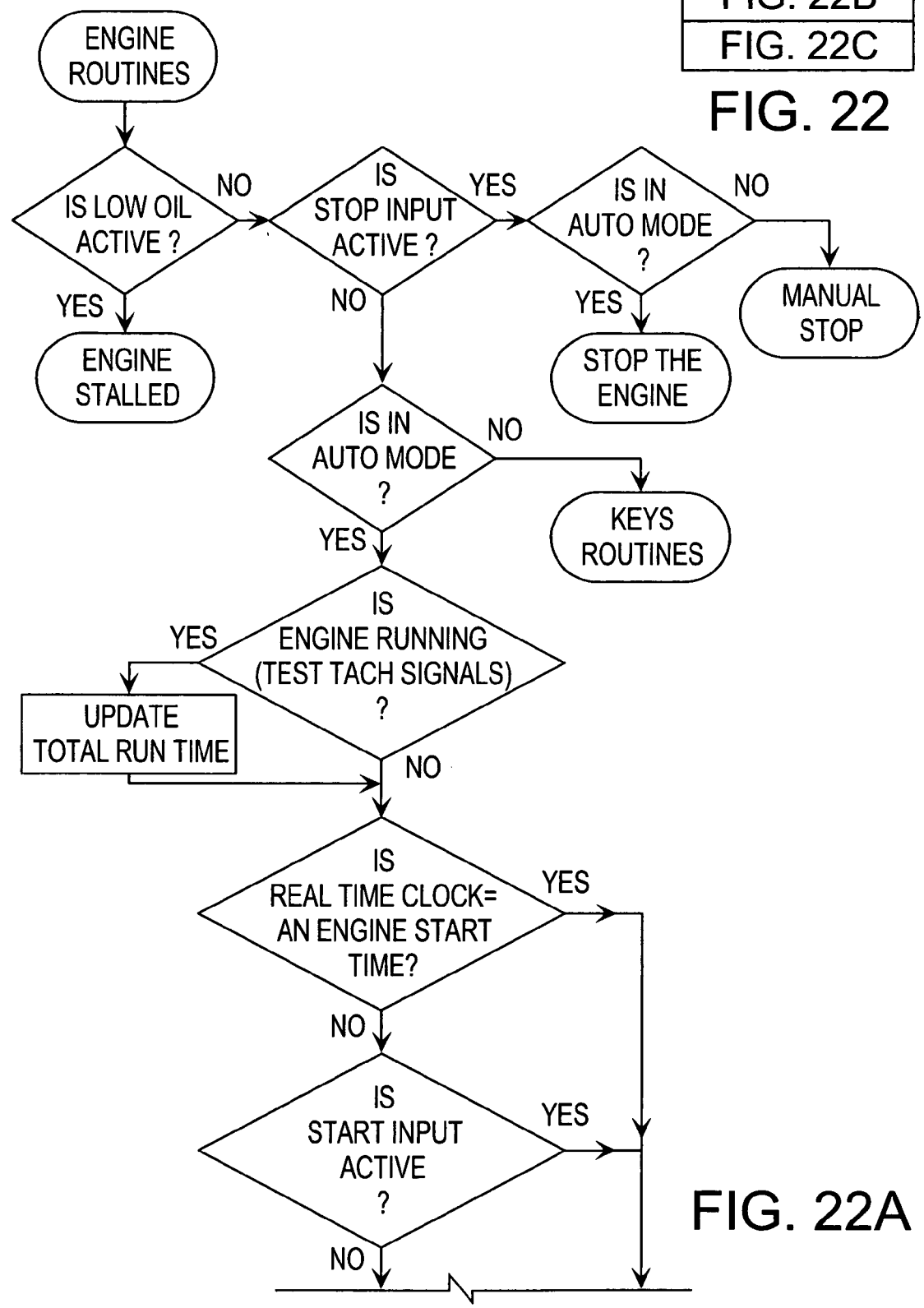
FIG. 22 is a flowchart illustrating steps of a method of controlling the present invention and its associated devices.
Figure 22B:
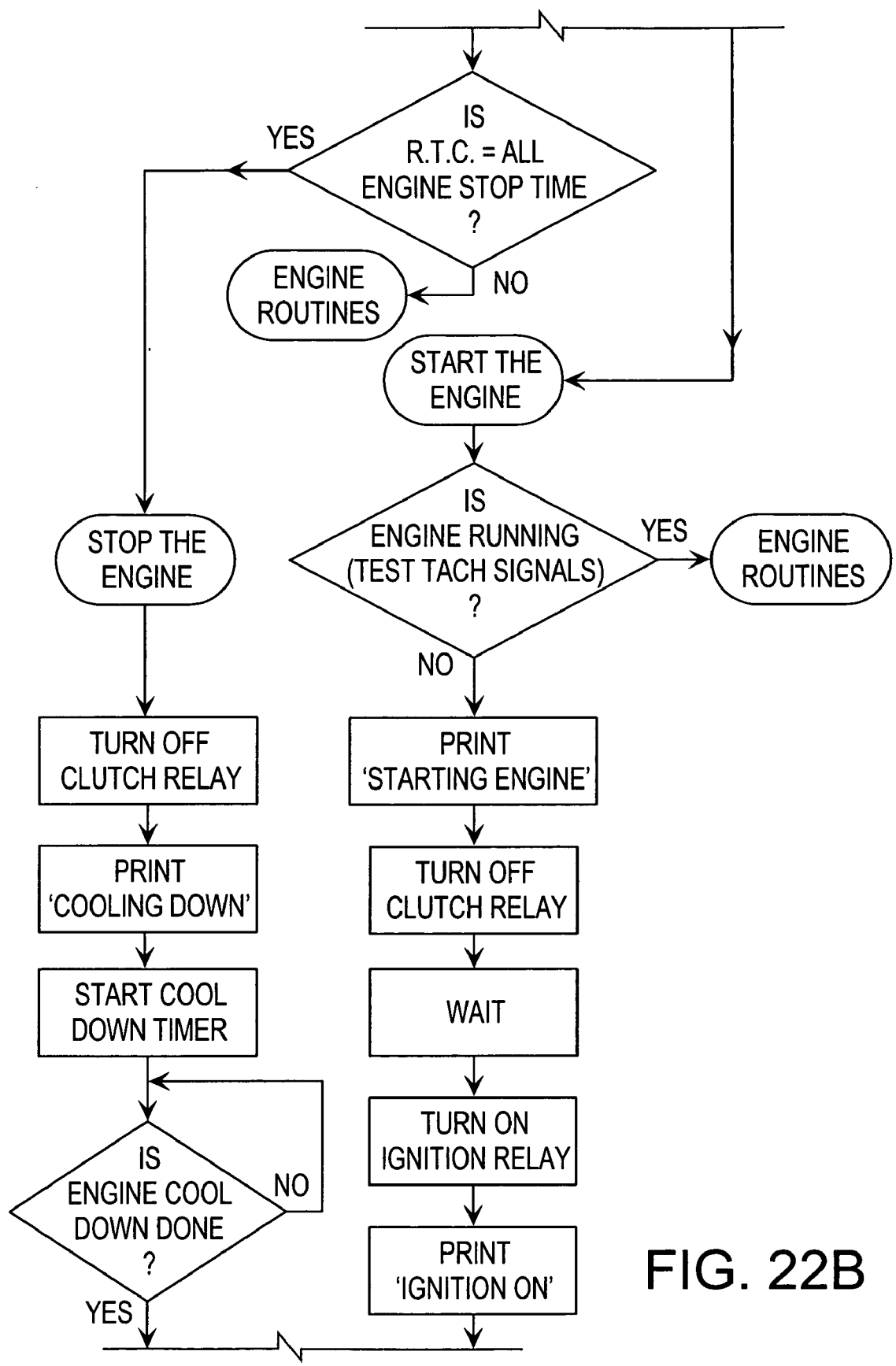
Figure 22C:
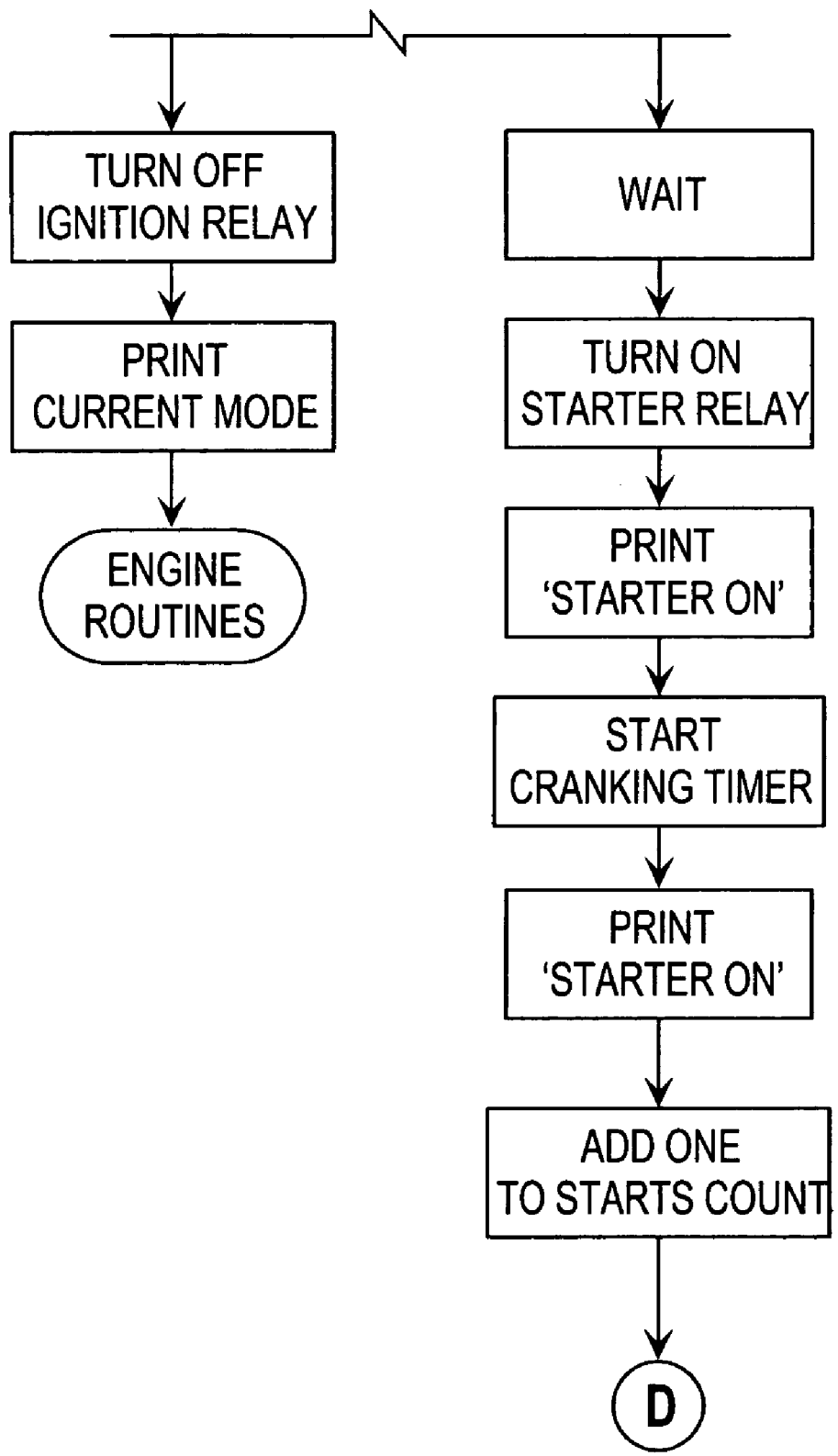
Figure 23B:
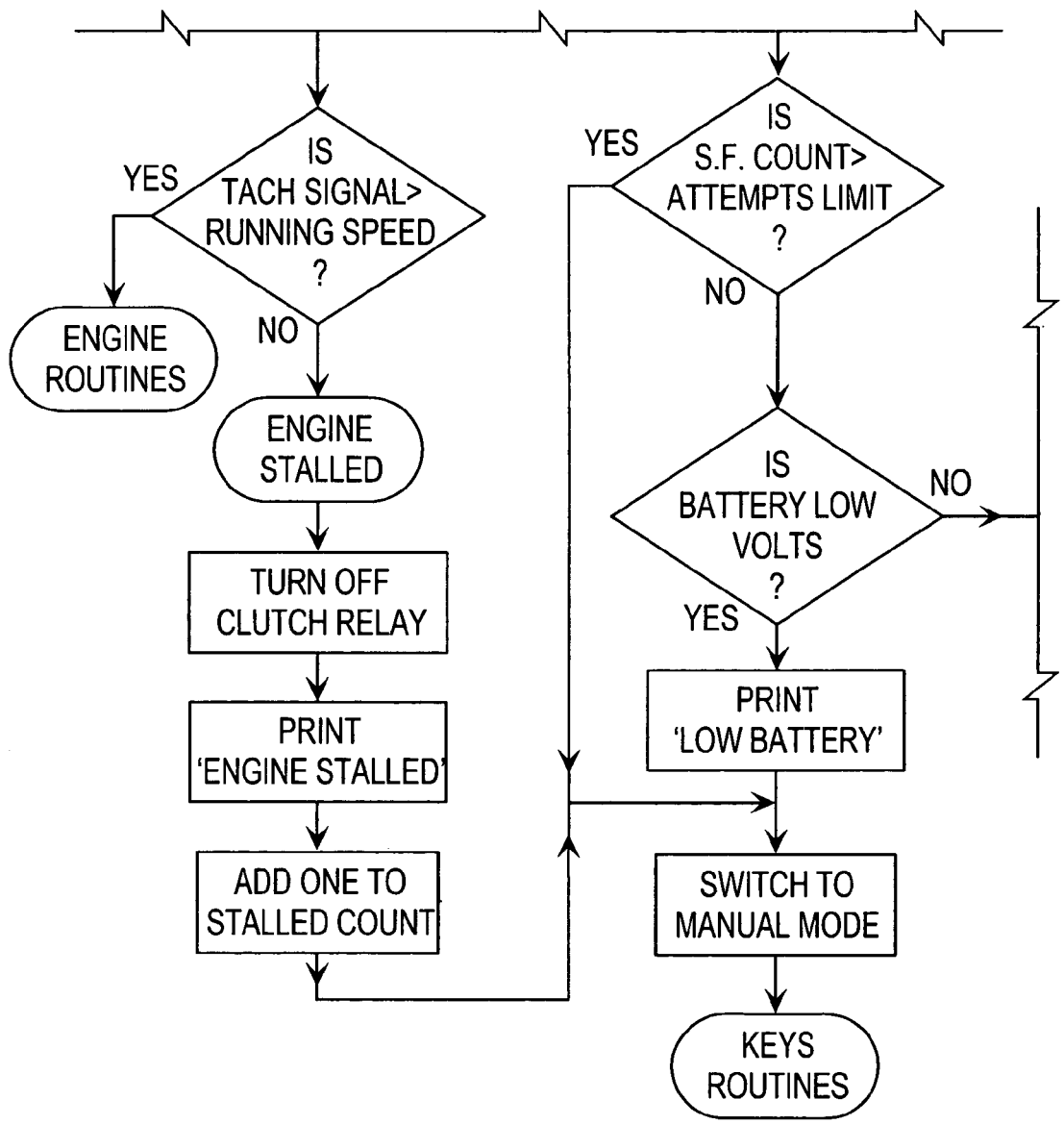
FIG. 23 is a continuation of the flowchart of FIG. 22.
Figure 23C:
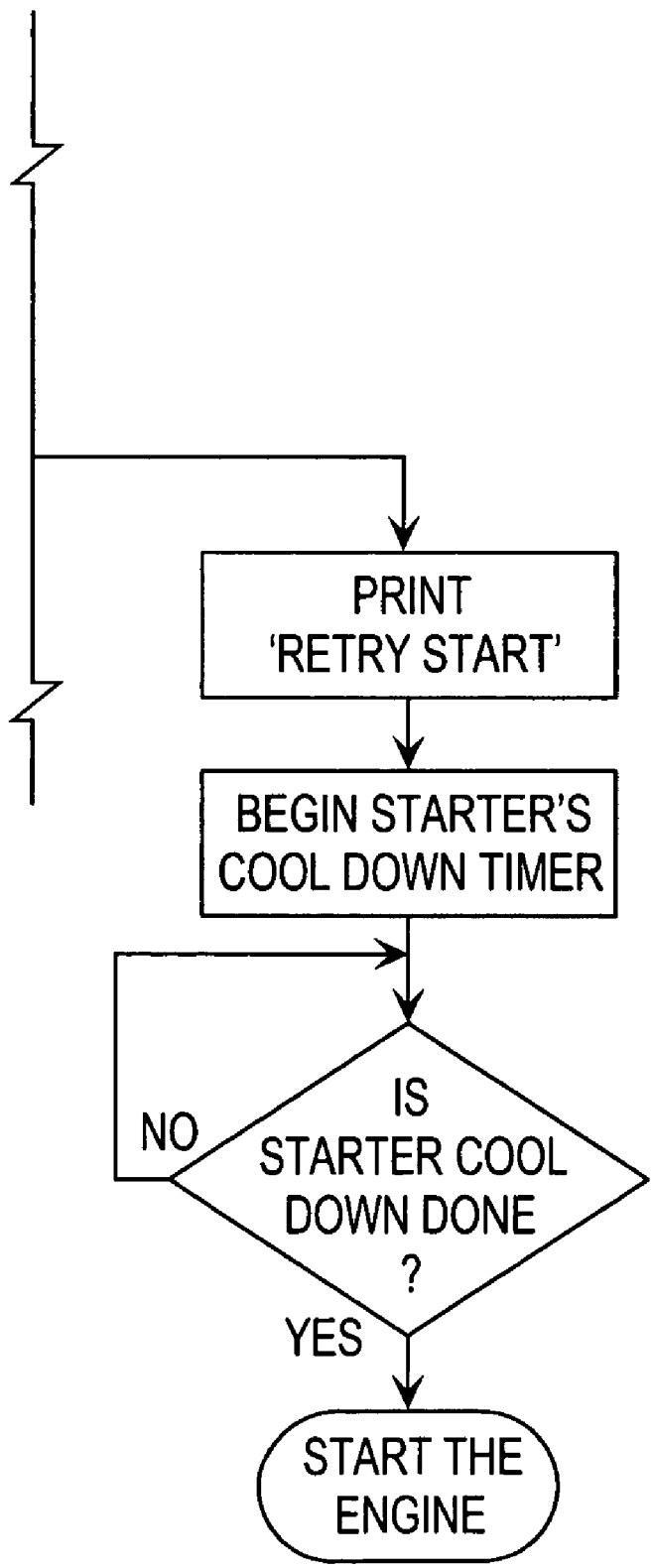

Another alternative to the preferred embodiment's arm 50 mounted to the extension 40 (as shown in FIGS. 1 and 2) is shown in FIG. 11, in which the bar 352 is mounted to the extension 340, which is analogous to the extension 40 of the FIG. 1 embodiment. The bar 352 forms legs 354 and 356 at opposite ends thereof, and attaches, such as by weldments or bolts, to the extension 340 intermediate its opposing ends. The prime movers 324 and 364 displace pusher arms 326 and 366, respectively, as in the embodiment of FIG. 1. Thus, the T-shaped arm and bar combination of FIG. 1 can be replaced with the embodiment of FIG. 11 if space permits.

Another alternative embodiment is shown schematically in FIGS. 12–15. In the first stage shown in FIG. 12, the clutch operating shaft 414 is in the clutch-disengaged position with the arm 416 closest to the prime mover 420. A double-acting prime mover 420 is pivotably mounted to a rigid structure, for example, the engine frame. A second double-acting prime mover 430 is pivotably mounted to the prime mover 420 and a rigid structure. Upon actuation of the prime mover 420, the pusher 422 is displaced toward the arm 416, thereby rotating the shaft 414 toward the clutch-engaging position. Once the shaft 414 reaches the break over point, the arm 416 unseats and separates from the pusher 422 due to the bias toward the extreme position, and thus engages the clutch at the position shown in FIG. 13.

At some time after the clutch is engaged, which could be immediately thereafter or after a significant time has passed, the prime mover 430 pivots the prime mover 420 upwardly, and the prime mover 420 extends its pusher 422 so that the end thereof extends past the arm 416. Upon reversing the prime mover 430 to lower the pusher 422, the pusher 422 hooks around the arm 416 and then the prime mover 420 retracts its pusher 422, thereby pulling the arm 416 toward the clutch-disengaged position as shown in FIG. 14. Once the arm 416 reaches the break over point, it is biased away from the hook at the end of the pusher 422, thereby rotating freely to the clutch-disengaged position as shown in FIG. 15. The prime mover 430 can displace the prime mover 420, and its pusher 422, away from the path of the arm 416. This embodiment shows yet another means for displacing the clutch operating shaft from its extreme positions.

The automatic displacement of the clutch operating shaft between the clutch-engaging position and the clutch-disengaging position is preferably controlled by means, such as a computer or logic circuit, in the present invention. A programmable micro-computer, a logic circuit, a mechanical computer or any other suitable device can operate as the means for actuating the various prime movers and other devices, as will become apparent to a person of ordinary skill from the description herein.

FIGS. 16–19 and FIGS. 20–23 are flowcharts illustrating steps of methods of controlling the engine and automatic clutch actuating apparatus. Thus, the method steps disclosed therein can be used with the invention described above. It should be understood that the flowchart of FIG. 16 continues in FIG. 17 as indicated by the encircled "A" at the bottom of FIG. 16 and the top of FIG. 17. Likewise, FIG. 18 continues in FIG. 19, FIG. 20 continues in FIG. 21 and FIG. 22 continues in FIG. 23.

While certain preferred embodiments of the present invention have been disclosed in detail, it is to be understood that various modifications may be adopted without departing from the spirit of the invention or scope of the following claims.

What is claimed is:

1. A clutch actuating apparatus for engaging and disengaging a clutch, and thereby drivingly linking and unlinking an engine and a driven device, the apparatus including an axle rotatable between a clutch-engaging position and a clutch-disengaging position with a break over point therebetween, the clutch actuating apparatus comprising:
   (a) a body drivingly linked to the axle to cause rotation of the axle when the body is displaced;
   (b) means for seating against and displacing the body in a first direction, thereby rotating the axle at least to near the break over point and for unseating from the body after the axle has reached the break over point and before the axle reaches the clutch-engaging position; and
   (c) means for seating against and displacing the body in a second, opposite direction, thereby rotating the axle at least to near the break over point and for unseating from the body after the axle has reached the break over point.

2. The clutch actuating apparatus in accordance with claim 1, wherein means for seating against and displacing the body in, a second, opposite direction, and for unseating from the body after the axle has reached the break over point further comprises means for unseating from the body before the axle has reached the clutch-disengaging position.

3. A method of engaging and disengaging a clutch apparatus, thereby drivingly linking and unlinking an engine and a driven device, the clutch apparatus including an axle rotatable between a clutch-engaging position and a clutch-disengaging position with a break over point therebetween, the method comprising:
   (a) drivingly linking a body to the axle;
   (b) displacing a first pusher toward the body, seating the first pusher against the body and then displacing the first pusher further until the axle is rotated in a first direction at least to near the break over point;
   (c) unseating the first pusher from the body after the axle has reached the break over point and before the axle reaches the clutch-engaging position, thereby permitting the axle to rotate to the clutch-engaging position substantially unrestricted; and
   (d) displacing a second pusher toward the body, seating the second pusher against the body and then displacing the second pusher further to rotate the axle in a second, opposite direction at least to near the break over point.

4. The method in accordance with claim 3, further comprising the step of unseating the second pusher from the body after the axle has reached the break over point, thereby permitting the axle to rotate to the clutch-disengaging position substantially unrestricted.

5. The method in accordance with claim 4, wherein the step of unseating the second pusher further comprises unseating the second pusher from the body before the axle reaches the clutch-disengaging position.

6. The method in accordance with claim 3, wherein the step of unseating the first pusher from the body further comprises displacing the first pusher away from the body.

7. A clutch actuating apparatus for engaging and disengaging a clutch, and thereby drivingly linking and unlinking an engine and a driven device, the apparatus including an axle rotatable between a clutch-engaging position and a clutch-disengaging position with a break over point therebetween, the clutch actuating apparatus comprising:
   (a) an elongated bar mounted transversely to the axle intermediate its opposing first and second bar ends, the first and second bar ends forming a first leg and a second leg, respectively;
   (b) a first prime mover having a displaceable pusher near the first leg;
   (c) a second prime mover having a displaceable pusher near the second leg; and
   (d) means for actuating the first prime mover to displace its pusher to seat against the first leg, and thereby rotate the axle in a first direction past the break over point toward the clutch-engaging position, and for subsequently actuating the second prime mover to displace its pusher against the second leg, and thereby rotate the axle in a second, opposite direction past the break over point toward the clutch-disengaging position.

8. The clutch actuating apparatus in accordance with claim 7, further comprising an arm interposed between the axle and the bar, the arm being radial to the axle and transverse to the bar.

9. The clutch actuating apparatus in accordance with claim 7, further comprising means for unseating the first prime mover's pusher from the first leg after the axle is rotated past the break over point and before the axle reaches the clutch-engaging position.

10. The clutch actuating apparatus in accordance with claim 7, further comprising a fast release valve drivingly linked to the first prime mover's pusher for unseating the first prime mover's pusher from the first leg after the axle is rotated past the break over point and before the axle reaches the clutch-engaging position.

* * * * *